United States Patent
Zhang et al.

(10) Patent No.: US 9,967,376 B2
(45) Date of Patent: May 8, 2018

(54) ELECTRONIC DEVICE INCLUDING MAIN BODY AND MOVABLE BODY

(71) Applicants: Beijing Lenovo Software Ltd., Beijing (CN); Lenovo (Beijing) Limited, Beijing (CN)

(72) Inventors: Shipeng Zhang, Beijing (CN); Yanyong Li, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 258 days.

(21) Appl. No.: 14/755,283

(22) Filed: Jun. 30, 2015

(65) Prior Publication Data

US 2016/0241686 A1 Aug. 18, 2016

(30) Foreign Application Priority Data

Feb. 16, 2015 (CN) .......................... 2015 1 0084534

(51) Int. Cl.
 *H04M 1/02* (2006.01)
 *H04M 1/04* (2006.01)
 *G06F 1/16* (2006.01)

(52) U.S. Cl.
 CPC ............ *H04M 1/026* (2013.01); *G06F 1/166* (2013.01); *H04M 1/0225* (2013.01); *H04M 1/0272* (2013.01); *H04M 1/0212* (2013.01); *H04M 1/04* (2013.01); *H04M 2250/20* (2013.01)

(58) Field of Classification Search
 CPC .. H04M 1/0212; H04M 1/0225; H04M 1/026; H04M 1/0272; H04M 1/04; H04M 2250/20; G06F 1/166
 USPC ............ 455/158.4, 550.1, 566, 575.1
 See application file for complete search history.

(56) References Cited

U.S. PATENT DOCUMENTS

| | | | |
|---|---|---|---|
| 2006/0105806 A1* | 5/2006 | Vance | H04M 1/0208 455/556.1 |
| 2008/0096618 A1* | 4/2008 | Zhu | H04M 1/0247 455/575.1 |
| 2009/0111515 A1* | 4/2009 | Joo | H04M 1/0208 455/556.1 |
| 2013/0157697 A1* | 6/2013 | Kang | H04W 4/02 455/457 |
| 2014/0295915 A1* | 10/2014 | Zhong | H04M 1/0245 455/556.1 |

* cited by examiner

*Primary Examiner* — Michael Mapa
(74) *Attorney, Agent, or Firm* — Schwegman Lundberg & Woessner, P.A.

(57) ABSTRACT

The present disclosure provides an electronic device, including: a movable body having at least one functional unit and a main body. The movable body is movable from a first position to a second position with respect to the main body, the main body has a first surface provided with a first display unit, the movable body includes a second surface, a long side of the second surface has a length identical to a length of a short side of the first surface. The first surface and the second surface are both located in a first plane when the movable body is located in the first position with respect to the main body.

26 Claims, 12 Drawing Sheets first posture at second position second posture at second position

ELECTRONIC DEVICE INCLUDING MAIN BODY AND MOVABLE BODY

PRIORITY APPLICATIONS

This application claims the benefit under 35 U.S.C. 119 to Chinese Application No. 201510084534.1, filed on 16 Feb. 2015; which application is incorporated herein by reference in its entirety.

FIELD

The present disclosure generally relates to a technical field of electronics, in particular to an electronic device.

BACKGROUND

As an electronic device develops, it has more and more strong function, in particular, many applications such video applications and web page applications are installed in both a cell phone and a tablet computer. In various applications, the electronic device needs to use different postures to achieve corresponding functions in a better manner. However, the electronic device in the prior art, such as the cell phone or the tablet computer, is in a bar form, and typically has a monotonous posture and thus it is difficult to meet the requirements for postures of various electronic devices in various applications.

SUMMARY

In accordance with an embodiment of the present disclosure, an electronic device is provided, which includes:
 a main body; and
 a movable body having at least one functional unit,
 wherein the movable body is operative to move from a first position to a second position with respect to the main body,
 the main body includes a first surface provided with a first display unit, the movable body includes a second surface, and
 the first surface and the second surface are both located in a first plane when the movable body is located in the first position with respect to the main body.

In accordance with an embodiment, an electronic device is provided, which includes:
 a main body; and
 a movable body having at least one functional unit,
 wherein the main body having a first surface provided with a first display unit, the movable body having a second surface and a fourth surface,
 the movable body is operative to move from a first position to a second position with respect to the main body,
 the first surface and the second surface are both located in a first plane when the movable body is located in the first position with respect to the main body,
 the fourth surface is located in a second plane all along during the movable body moving with respect to the main body, the second plane being perpendicular to the first plane, and
 an intersection line of the second plane and the first plane is parallel to a short side of the first surface.

In accordance with an embodiment, an electronic device is provided, which includes:
 a main body; and
 a movable body having at least one functional unit,
 wherein the main body having a first surface provided with a first display unit and a third surface, the movable body having a second surface and a fourth surface,
 the movable body is operative to move from a first position to a second position with respect to the main body,
 when the movable body is located in the first position with respect to the main body, the engagement area of the third surface and the fourth surface reaches maximum value, the first surface and the second surface are both located in the first plane,
 when the movable body is located in the second position with respect to the main body, the engagement area of the third surface and the fourth surface is less than the maximum value, and
 the third surface and the fourth surface are both perpendicular to the first plane, the third surface is provided with at least one functional unit.

In accordance with an embodiment, an electronic device is provided, which includes:
 a main body; and
 a movable body having at least one functional unit,
 wherein the movable body is operative to move from a first position to a second position with respect to the main body;
 the main body includes a first surface provided with a first display unit, the movable body includes a second surface; a long side of the second surface has a length identical to a length of a short side of the first surface, and
 the first surface and the second surface are both located in a first plane when the movable body is located in the first position with respect to the main body,
 the electronic device has a first operation mode and a second operation mode; the electronic device is operative to be in the first operation mode when the movable body is located in the first position with respect to the main body, the electronic device is operative to be in the second operation mode when the movable body is located in the second position with respect to the main body.

In accordance with an embodiment, an electronic device is provided, which includes:
 a main body; and
 a movable body having at least one functional unit,
 wherein the movable body is operative to move from a first position to a second position with respect to the main body,
 the main body includes a first surface provided with a first display unit, the movable body includes a second surface,
 the first surface and the second surface are both located in a first plane when the movable body is located in the first position with respect to the main body, and
 the movable body includes a second end surface adjacent to the second surface, and the functional unit includes a second functional unit arranged at least partly on the second end surface.

In accordance with an embodiment, an electronic device is provided, which includes:
 a main body; and
 a movable body having at least one functional unit,
 wherein the movable body is operative to move from a first position to a second position with respect to the main body, the main body includes a first surface provided with a first display unit, the movable body includes a second surface,
 the first surface and the second surface are both located in a first plane when the movable body is located in the first position with respect to the main body, and the main body further includes a third surface and the movable body further includes a fourth surface, the third surface and the fourth surface at least partly facing each other, and the functional unit includes a third functional unit arranged at least partly on the fourth surface.

In accordance with an embodiment, an electronic device is provided, which includes:

a main body; and a movable body having at least one functional unit;

wherein the movable body is operative to move from a first position to a second position with respect to the main body, the main body includes a first surface provided with a first display unit, the movable body includes a second surface, the first surface and the second surface are both located in a first plane when the movable body is located in the first position with respect to the main body, and the movable body is provided with at least two different types of functional units thereon.

In accordance with an embodiment, an electronic device is provided, which includes:

a main body; and a movable body having at least one functional unit, wherein the main body includes a first surface provided with a first display unit, the movable body includes a second surface and a first end surface, the movable body is operative to move from a first position to a second position with respect to the main body, the first surface and the second surface are both located in a first plane when the movable body is located in the first position with respect to the main body, and the movable body is operative to move in a third plane with respect to the main body, the first end surface is located in the third plane all along during the movable body moving in the third plane with respect to the main body, the third plane is perpendicular to the first plane, and an intersection line of the third plane and the first plane is parallel to a long side of the first surface.

DETAILED DESCRIPTION OF THE EMBODIMENTS

Embodiments of the present disclosure will be described hereinafter in more detail with reference to figures of the attached drawings and examples.

In view of the problem that the conventional electronic device has a monotonous and inflexible posture and thus causes poor user's experiences, an embodiment of the present disclosure provides an electronic device at least including a main body and a movable body. The movable body is movable with respect to the main body. The electronic device is imparted with different postures by change of the position relation between the movable body and the main body. It avoids the monotonous and inflexible form of the electronic device in the prior art. The electronic device may be used in various applications by moving the movable body to change the position relation between the movable body and the main body and thus, it may improve the user's experiences. The electronic device according to the embodiment may be for example a cell phone, a tablet computer, an e-book, PDA, or the like.

First Embodiment of the Electronic Device

Figure 1:
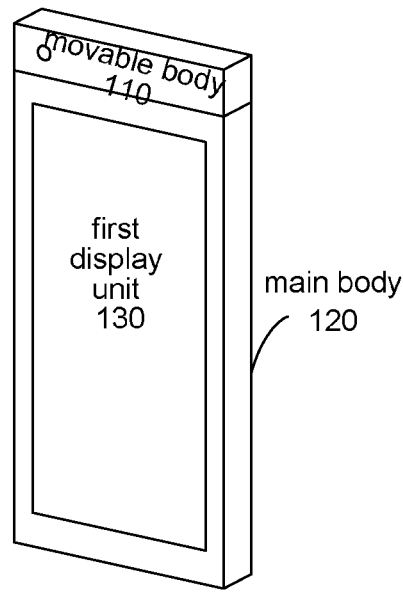
FIG. 1 is a schematic view showing a first structure of an electronic device according to an embodiment of the present disclosure.
Figure 2:
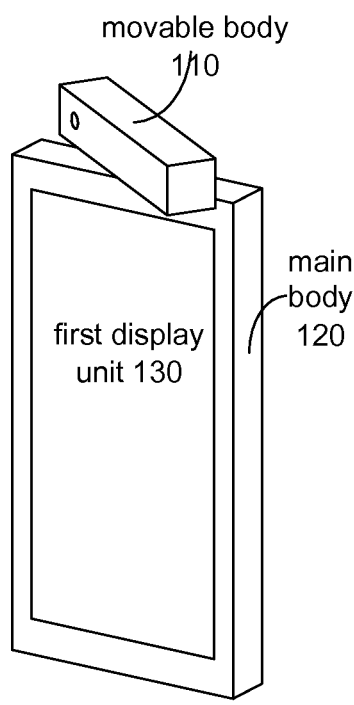
FIG. 2 is a schematic view showing a second structure of an electronic device according to an embodiment of the present disclosure.

An embodiment of the present disclosure provides an electronic device, as illustrated in FIGS. 1-2. The electronic device includes: a movable body 110 in which at least one functional unit is arranged and a main body 120.

The movable body 110 is movable from a first position to a second position with respect to the main body, and the main body 120 comprises a first surface provided with a first display unit 130, the movable body 110 comprises a second surface which has a length of a long side identical to a length of a short side of the first surface. The term of "a second surface which has a length of a long side identical to a length of a short side of the first surface" means herein that the second surface has a length of a long side equal to or approximately equal to a length of a short side of the first surface.

As shown in FIG. 1, the first surface and the second surface are both located in a first plane when the movable body 110 is located in the first position with respect to the main body 120.

In the embodiment, the main body 120 typically has a volume greater than the volume of the movable body 110, and the main body 120 has a surface area greater than that of the movable body 110. And the main body 120 has more functional units than that of the movable body 110. Furthermore, the main body 120 may achieve function complexity higher than that of the movable body 110.

In the embodiment, the functional unit arranged in the electronic device includes a power supply unit, such as a rechargeable battery. Typically, this power supply unit is configured to power a functional unit in the electronic device that needs power consumption to achieve a certain specific function. In this way, the power consumption of the functional unit arranged on the movable body may also supplied by the power supply unit on the main body 120.

In the embodiment, the main body 120 includes a first display unit 130 which may include a display region. The display region is located on a first surface of the main body 120. The display region may typically be a rectangular display region as shown in FIG. 1 or 2.

As an example, the first display unit 130 may include a liquid crystal display screen or an electronic display screen such as an e-ink display screen, an organic light emitting diode (OLED) display screen.

As an example, the movable body 110 may typically have a shape of strip. The second surface has a long side and a short side. In particular, as illustrated in FIG. 1 and FIG. 2, the movable body has a rectangular shape and the second surface has a long side and a short side.

In the embodiment, the main body 120 also typically has a substantially rectangular shape including a long side and a short side. In the embodiment, the long side of the movable body 110 is equal to the short side of the main body. Further, the movable body 110 and the main body 120 may have an equal thickness to each other or the thickness of the movable body 110 is slightly less than that of the main body.

The embodiment provides an electronic device. The electronic device includes a movable body 110 which is movable with respect to the main body 120. Such electronic device can have at least two postures. And in the embodiment, the movable body 110 is further provided with a functional unit such that the movable body also increases the space and area for arranging the functional unit in the electronic device. And typically, the at least one functional unit on the movable body 110 is a power consumption unit that needs electrical energy to work.

Second Embodiment of the Electronic Device

An embodiment of the present disclosure provides an electronic device, as illustrated in FIGS. 1-2. The electronic device includes: a movable body 110 in which at least one functional unit is arranged and a main body 120.

The movable body 110 is movable from a first position to a second position with respect to the main body, and the main body 120 comprises a first surface provided with a first display unit 130, the movable body 110 comprises a second surface which has a length of a long side identical to a length of a short side of the first surface. The term of "a length of a long side identical to a length of a short side of the first surface" means herein that the length of a long side equal to or approximately equal to, for example slightly different from, a length of a short side of the first surface.

The first surface and the second surface are both located in a first plane when the movable body 110 is located in the first position with respect to the main body 120.

The movable body 110 is able to support the main body 120 when the movable body 110 is located in the second position with respect to the main body 120.

In the prior art, many hand-held electronic devices have a bar form and typically cannot be supported stably and obliquely on the table without any other supporting members. In the embodiment, by means of the movable body, the electronic device may be supported stably. In this way, when the user does an image capturing or a video call by the electronic device, the electronic device may be held stably on the table. Thus, it may reduce the adverse phenomenon such as degradation of image and video quality caused by tremble of hand in comparison with the case that the user does an image capturing or a video call while holding the electronic device.

Third Embodiment of the Electronic Device

An embodiment of the present disclosure provides an electronic device, as illustrated in FIGS. 1-2. The electronic device includes: a movable body 110 in which at least one functional unit is arranged and a main body 120.

The movable body 110 is movable from a first position to a second position with respect to the main body, and the main body 120 comprises a first surface provided with a first display unit 130, the movable body 110 comprises a second surface which has a length of a long side identical to a length of a short side of the first surface.

The first surface and the second surface are both located in a first plane when the movable body 110 is located in the first position with respect to the main body 120.

The movable body 110 is able to support the main body 120 when the movable body 110 is located in the second position with respect to the main body 120.

Figure 3:
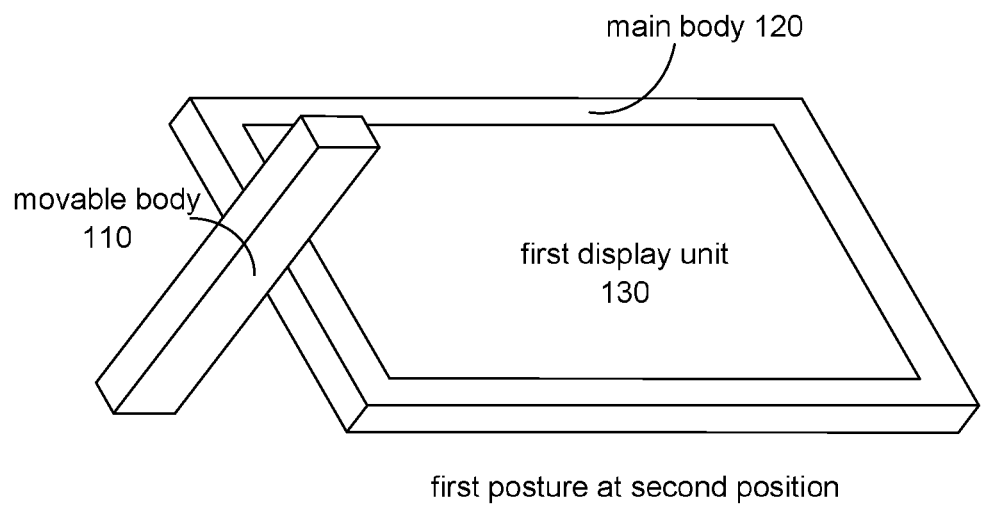
FIG. 3 is a schematic view showing a first posture of an electronic device according to an embodiment of the present disclosure.

As shown in FIG. 3, the posture of the electronic device includes a first posture.

When the electronic device is in the first posture, the movable body is located in the second position with respect to the main body and a first portion of the movable body and a second portion of the main body may be configured to support the electronic device.

In the embodiment, the first portion of the movable body 110 may be located at an end portion of the movable body 110, or may be located at a side face of the movable body 110. As an example, when the movable body 110 is a column, the second surface is located at a side face of the column. The end surface is located on the top face or bottom face of the column. Typically, the top face and the bottom face have areas less than the area of the side face.

Typically, the first portion is the portion on which the short side of the second surface on the movable body 110. The second portion is typically the portion which is arranged on the main body 120 and parallel to the long side of the first surface.

Figure 4:
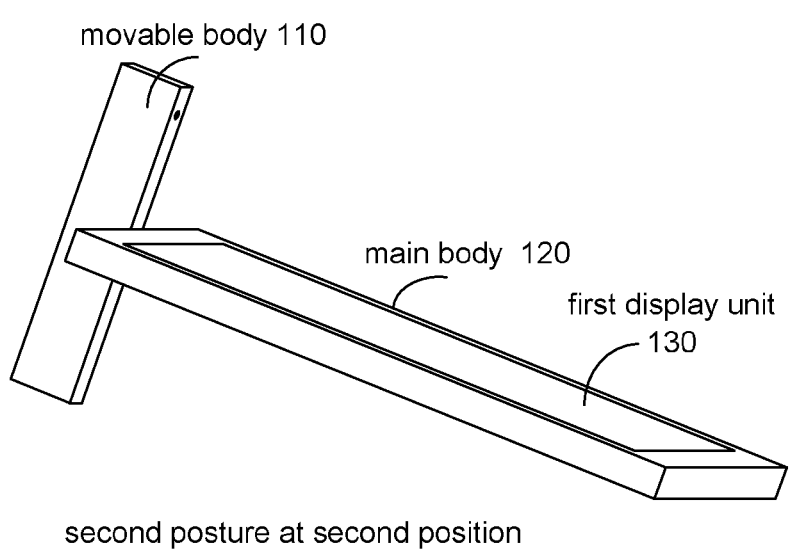
FIG. 4 is a schematic view showing a second posture of an electronic device according to an embodiment of the present disclosure.

As illustrated in FIG. 4, the posture of the electronic device includes a second posture.

When the electronic device is in the second posture, the movable body 110 is located in the second position with respect to the main body 120 and the first portion of the movable body 110 and a third portion of the main body 120 are able to support the electronic device.

When the electronic device is in the second posture, the first portion of the movable body 110 may still be a part of one of two end portions of the movable body 110. The third portion may be the portion which is arranged on the main body 120 and parallel to the short side of the first surface.

Apparently, any one of such two support postures of the electronic device according to the embodiment may be used to support the electronic device well.

As an example, when the electronic device is in the first posture, the movable body 110 forms an angle to the main body 120, i.e., a first angle, which may be 45-60 degrees, but it is not limited to the range of angle. When the electronic device is in the second posture, the movable body 110 forms an angle to the main body 120, i.e., a second angle, which may be about 90 degrees. In this way, the first angle is typically unequal to the second angle.

Fourth Embodiment of the Electronic Device

An embodiment of the present disclosure provides an electronic device, as illustrated in FIGS. 1-2. The electronic device includes: a movable body 110 in which at least one functional unit is arranged and a main body 120.

The movable body 110 is movable from a first position to a second position with respect to the main body, the main body 120 comprises a first surface provided with a first display unit 130, the movable body 110 comprises a second surface which has a length of a long side identical to a length of a short side of the first surface.

The first surface and the second surface are both located in a first plane when the movable body 110 is located in the first position with respect to the main body 120.

The movable body 110 is able to support the main body 120 when the movable body 110 is located in the second position with respect to the main body 120.

The movable body has an end portion comprising a first end surface adjacent to the second surface.

The first end surface is able to support the main body when the movable body 110 is located in the second position with respect to the main body 120.

In the embodiment, it is the end surface of the movable body 110 that supports the main body. And the first posture and the second posture in the fourth embodiment also preferably use the first end surface to support the main body.

Fifth Embodiment of the Electronic Device

Figure 5:
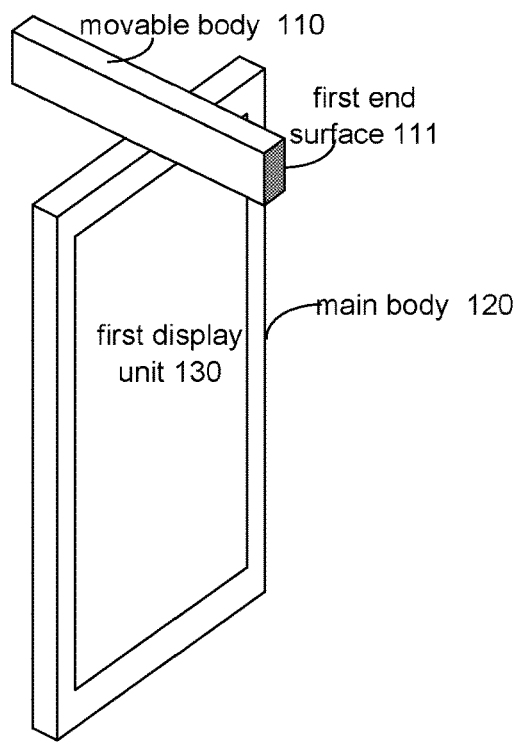
FIG. 5 is a schematic view showing a third structure of an electronic device according to an embodiment of the present disclosure.

An embodiment of the present disclosure provides an electronic device, as illustrated in FIGS. 1-2, 5. The electronic device includes: a movable body 110 in which at least one functional unit is arranged and a main body 120.

The movable body 110 is movable from a first position to a second position with respect to the main body, and the main body 120 comprises a first surface provided with a first display unit 130, the movable body 110 comprises a second surface which has a length of a long side identical to a length of a short side of the first surface.

The first surface and the second surface are both located in a first plane when the movable body 110 is located in the first position with respect to the main body 120.

The movable body 110 is able to support the main body 120 when the movable body 110 is located in the second position with respect to the main body 120.

The movable body 110 has an end portion comprising a first end surface adjacent to the second surface.

The first end surface 111 is able to support the main body when the movable body 110 is located in the second position with respect to the main body 120.

Part of the first end surface 111 is provided with micro-protrusions that are configured to support the main body.

In the embodiment, the micro-protrusions may be particle protrusions with outer diameters of 1 mm to 10 µm, for example, 50 µm. Certainly, in practice, the micro-protrusions also may have sizes of 5 µm, instead of being limited to the above sizes.

These micro-protrusions can enhance the frictional coefficients between them and the support face for supporting the electronic device so as to take the effects of stabilizing the support in lengthwise and sidewise directions.

The micro-protrusions may directly be arranged on a housing of the movable body. The micro-protrusions may be formed while the housing of the movable body is moulded. In this way, the housing of the movable body and the micro-protrusions formed in single piece, which may simplify the production of the electronic device.

Sixth Embodiment of the Electronic Device

An embodiment of the present disclosure provides an electronic device, as illustrated in FIGS. 1-2, 5. The electronic device includes: a movable body 110 in which at least one functional unit is arranged and a main body 120.

The movable body 110 is movable from a first position to a second position with respect to the main body, the main body 120 comprises a first surface provided with a first display unit 130, the movable body 110 comprises a second surface which has a length of a long side identical to a length of a short side of the first surface.

The first surface and the second surface are both located in a first plane when the movable body 110 is located in the first position with respect to the main body 120.

The movable body 110 is able to support the main body 120 when the movable body 110 is located in the second position with respect to the main body 120.

The movable body 110 has an end portion comprising a first end surface adjacent to the second surface.

The first end surface 111 is able to support the main body when the movable body 110 is located in the second position with respect to the main body 120.

Part of the first end surface 111 is provided with micro-protrusions that are configured to support the main body.

Part of the first end surface is provided with a plastic layer on which the micro-protrusions are arranged.

In the embodiment, the body of the movable body 110 for supporting the movable body further includes the plastic layer. It has an advantage of larger frictional coefficients, in comparison with smooth metal housing and plastic housing for producing the electronic device. In the embodiment, the plastic layer may be a rubber layer. Provision of the microprotrusions causes the plastic layer to have a coarse surface. In the embodiment, the plastic layer has a color identical to the color of other portions of the movable body.

Seventh Embodiment of the Electronic Device

An embodiment of the present disclosure provides an electronic device, as illustrated in FIGS. 1-2, 5. The electronic device includes: a movable body 110 in which at least one functional unit is arranged and a main body 120.

The movable body 110 is movable from a first position to a second position with respect to the main body, the main body 120 comprises a first surface provided with a first display unit 130, the movable body 110 comprises a second surface which has a length of a long side identical to a length of a short side of the first surface.

The first surface and the second surface are both located in a first plane when the movable body 110 is located in the first position with respect to the main body 120.

The movable body 110 is able to support the main body 120 when the movable body 110 is located in the second position with respect to the main body 120.

The movable body 110 has an end portion comprising a first end surface adjacent to the second surface.

The first end surface is able to support the main body when the movable body 110 is located in the second position with respect to the main body 120.

Figure 6:
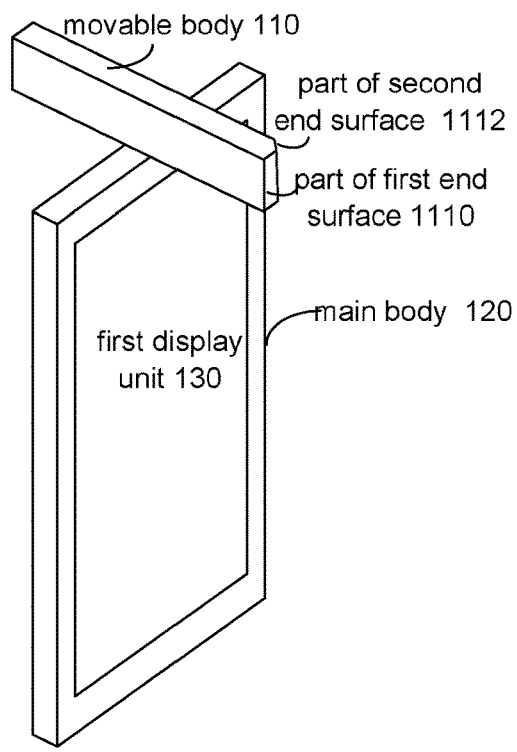
FIG. 6 is a schematic view showing a fourth structure of an electronic device according to an embodiment of the present disclosure.

As illustrated in FIG. 6, the first end surface comprises a first end surface portion 1110 and a second end surface portion 1112 distributed adjacently, the first end surface portion 1110 and the second end surface portion 1112 being located in different planes. The second end surface portion 1112 is adjacent to the second surface and configured to support the main body.

If the first end surface is a plane perpendicular to the second surface, there will be a small contact area between the first end surface and the supporting face when the first end surface is used to support the electronic device. It may cause that the electronic device cannot be supported stably. In the embodiment, in order to stabilize the support, the first end surface is provided as an irregular face to increase the contact area between the first end surface and the supporting face.

Typically, the supporting face for supporting the electronic device is also a plane. In the embodiment, in order to further stabilize the support of the electronic device, the second end portion is typically provided as a plane. However, the second end portion may be provided as a coarse plane. In this way, there is the larger static frictional force between the supporting face and it may further achieve stable support.

Eighth Embodiment of the Electronic Device

An embodiment of the present disclosure provides an electronic device, as illustrated in FIGS. 1-2. The electronic device includes: a movable body 110 in which at least one functional unit is arranged and a main body 120.

The movable body 110 is movable from a first position to a second position with respect to the main body, and the main body 120 comprises a first surface provided with a first display unit 130, the movable body 110 comprises a second surface which has a length of a long side identical to a length of a short side of the first surface.

The first surface and the second surface are both located in a first plane when the movable body 110 is located in the first position with respect to the main body 120.

The functional unit arranged on the movable body 110 comprises at least two types of functional units that have different functions from each other.

As an example, the functional unit arranged on the movable body 110 may comprise such as an image capturing unit, an audio output unit, a position sensing unit for a movable unit, an antenna unit.

In the embodiment, the electronic device may be a first electronic device. The first electronic device uses the space of the movable body sufficiently, provides different types of functional units, and achieves compact layout of the first electronic device.

Ninth Embodiment of the Electronic Device

An embodiment of the present disclosure provides an electronic device, as illustrated in FIGS. 1-2. The electronic device includes: a movable body 110 in which at least one functional unit is arranged and a main body 120.

The movable body 110 is movable from a first position to a second position with respect to the main body, and the main body 120 comprises a first surface provided with a first display unit 130, the movable body 110 comprises a second surface which has a length of a long side identical to a length of a short side of the first surface.

The first surface and the second surface are both located in a first plane when the movable body 110 is located in the first position with respect to the main body 120.

The functional unit arranged on the movable body 110 comprises at least two types of functional units that have different functions from each other.

The functional unit arranged on the movable body 110 further comprises an audio output unit.

The electronic device according to the embodiment may be a communication apparatus. The audio output unit according to the embodiment may correspond to an earphone of the communication apparatus. The audio output unit is located on the movable body 110, which generally represents that the movable body 110 is located at the top of the electronic device instead of being at the bottom or side of the electronic device. However, in practice, the movable body 110 may also be provided at the bottom of the electronic device and the movable body is provided with a functional unit such as an audio collection unit thereon.

In a further embodiment, the main body 120 is provided with an audio collection unit at an end away from the movable body 110.

As a communication apparatus, the electronic device may further include a microphone besides the earphone, that is, the audio collection unit configured to collect a voice inputted by the user. In the embodiment, the audio collection unit is arranged on the main body 120, and arranged on the main body 120 away from the movable body 110.

In an example, optionally, when the movable body 110 is located in the first position with respect to the main body 120, the audio output unit is located in a first corner region of the first electronic device and the audio collection unit is located in a second corner region of the first electronic device, a connecting line formed by the first corner region and the second corner region includes a diagonal of the first electronic device in this direction. When the user holds the communication apparatus to do a call, the first corner region is adapted to adjoin ears of the user. Such construction design is more suitable to human construction design, which may allow the user hear voices with higher db by lower output power and may clearly collect the voice inputted by the user.

Tenth Embodiment of the Electronic Device

Figure 7:
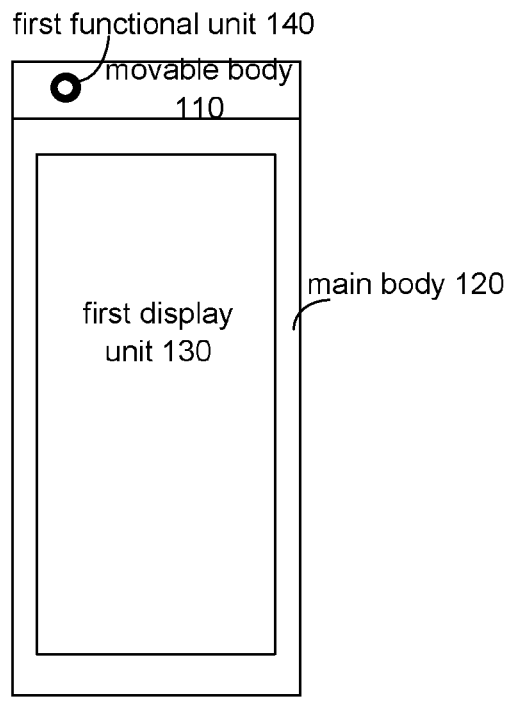
FIG. 7 is a schematic view showing a fifth structure of an electronic device according to an embodiment of the present disclosure.

As illustrated in FIG. 7, an embodiment of the present disclosure provides an electronic device. The electronic device includes: a movable body 110 and a main body 120.

The movable body 110 is movable from a first position to a second position with respect to the main body 120, and the main body 120 comprises a first surface provided with a first display unit 130, the movable body comprises a second surface.

The first surface and the second surface are both located in a first plane when the movable body 110 is located in the first position with respect to the main body 120.

At least one functional unit is arranged in the movable body, the at least one functional unit comprising a first functional unit 140 located at least partly on the second surface.

The movable body 110 further comprises a first end surface and a second end surface adjacent to the second surface.

There is a first distance between the first functional unit 140 and the first end surface while there is a second distance between the first functional unit 140 and the second end surface. The first distance is unequal to the second distance.

In the embodiment, the above first functional unit 140 may be a functional unit such as an image capturing unit. In the embodiment, the first functional unit 140 is parallel to the long side direction of the second surface, and deviates from a central position of the movable body 110.

In the embodiment, the electronic device includes the main body and the movable body which is connected movably to the main body such that the electronic device has various postures to diversify the postures of the electronic device. Also, the movable body of the electronic device is provided with a functional unit therein, which can achieve a compact and simple electronic structure.

Eleventh Embodiment of the Electronic Device

As illustrated in FIG. 7, an embodiment of the present disclosure provides an electronic device. The electronic device includes: a movable body 110 and a main body 120.

The movable body 110 is movable from a first position to a second position with respect to the main body 120, and the main body 120 comprises a first surface provided with a first display unit 130, the movable body comprises a second surface.

The first surface and the second surface are both located in a first plane when the movable body 110 is located in the first position with respect to the main body 120.

At least one functional unit is arranged in the movable body 110, the at least one functional unit comprising a first functional unit 140 located at least partly on the second surface.

The movable body 110 further comprises a first end surface and a second end surface adjacent to the second surface.

There is a first distance between the first functional unit 140 and the first end surface while there is a second distance between the first functional unit 140 and the second end surface. The first distance is unequal to the second distance.

The movable body 110 is able to support the main body when the movable body 110 is located in the second position with respect to the main body 120.

In the embodiment, the movable body 110 has an end portion which is able to support the main body. Apparently, at least one end of the movable body 110 is not blocked by the main body 120.

As an example, the support posture of the electronic device may include the first posture as shown in FIG. 3 or the second posture as shown in FIG. 4.

Twelfth Embodiment of the Electronic Device

Figure 8:
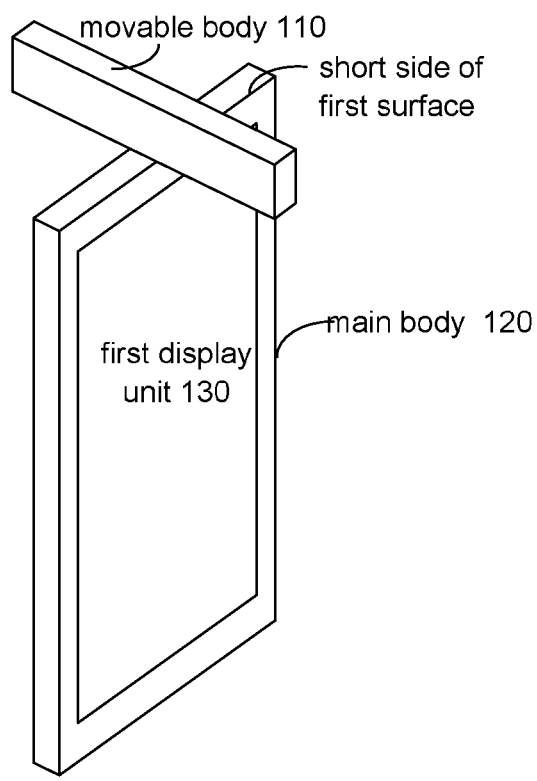
FIG. 8 is a schematic view showing a sixth structure of an electronic device according to an embodiment of the present disclosure.

As illustrated in FIG. 8, an embodiment of the present disclosure provides an electronic device. The electronic device includes: a movable body 110 and a main body 120, the movable body 110 being provided with at least one functional unit therein, the main body 120 comprising a first surface provided with a first display unit 130, the movable body comprising a second surface.

The movable body 110 is movable from a first position to a second position with respect to the main body 120.

The first surface and the second surface are both located in a first plane when the movable body 110 is located in the first position with respect to the main body 120.

The movable body 110 is able to rotate in a second plane.

The second plane is perpendicular to the first plane.

An intersection line of the second plane with the first plane is parallel to a short side of the first surface.

As an example, the first display unit 130 may include a liquid crystal display screen or an electronic display screen such as an e-ink display screen or an organic light-emitting diode (OLED) display screen.

In the embodiment, the movable body 110 can be provided with a first pivot between the movable body 110 and the main body 120. The pivot is connected movably with the movable body 110 and the main body 120 respectively. The first pivot is arranged in a plane parallel to the first plane, that is, the first pivot is perpendicular to the second plane. The first pivot may have a shape of long cylinder or may have a shape of ellipsoid. The shapes and structures of the pivot are not limited. It may be any one of pivots in the prior art as long as it may achieve the rotation of the movable body 110 in the second plane with respect to the main body 120.

In the embodiment, the movable body 110 of the electronic device may rotate in the second plane, for example, by following regular or irregular circular motion, such as 360 degrees regular circular motion or semi-circular motion with less than 360 degrees. Obviously, as the movable body 110 rotates, the electronic device may exhibit a posture in which at least movable body 110 is aligned with the main body 120, or may exhibit a posture in which the movable body 110 in the second plane crosses the main body 120. And in the second plane, the movable 110 may form different crossing angles with respect to the main body 120.

If the movable body 110 is provided with an antenna unit, the antenna unit will move to different positions along with the movable body 110 and become in different signal receiving and transmitting positions. In this way, when the antenna unit has a poor communication quality at a position, the movable body 110 may be rotated to change the position of the antenna unit to improve the communication quality.

Again, assuming that an image capturing unit is arranged on the movable body, during performing an image capturing by the electronic device, at first, the electronic device may be supported on the table by the movable body 110 to perform stable image capturing. And if images need to be collected from different angles, it may be achieved by adjusting the different crossing angles of the movable body 110 in the second plane with respect to the main body 120.

In a further embodiment, the movable body 110 has an end portion which is able to support the main body when the movable body 110 is located in the second position with respect to the main body 120.

In the embodiment, the movable body may have a shape of strip, such as cylinder, cube or ellipsoid. The strip includes a side face having a larger surface area and two end surfaces having smaller surface areas. The locations of the end surfaces may be regarded as the end portion of the movable body having the shape of strip.

In the embodiment, the end portion of the movable body 110 may be configured to support the main body so as to hold the main body stably on the supporting face obliquely or uprightly.

In summary, the electronic device in the embodiment includes the main body 120 and movable body 110 that are able to rotate with respect to each other in the second plane. The main body 120 and the movable body 110 may achieve the corresponding functions in a better manner by providing different function units for different functions in the movable body and moving the movable body 110 in the second plane.

Thirteenth Embodiment of the Electronic Device

As illustrated in FIG. 8, an embodiment of the present disclosure provides an electronic device. The electronic device includes: a movable body 110 and a main body 120, the movable body 110 being provided with at least one functional unit therein, the main body 120 comprising a first surface provided with a first display unit 130, the movable body 110 comprising a second surface and a fourth surface. The movable body 110 is movable from a first position to a second position with respect to the main body 120. The first surface and the second surface are both located in a first plane when the movable body 110 is located in the first position with respect to the main body 120. The fourth surface is located in a second plane all along when the movable body 110 moves with respect to the main body 120, the second plane being perpendicular to the first plane. An intersection line of the second plane and the first plane is parallel to a short side of the first surface.

The main body 120 further includes a third surface. When the third surface and the fourth surface move in the second plane along with the main body, the third surface and the fourth surface are inter-engaged. As the movable body 110 moves in the second plane, the area of the engaging face of the third surface and the fourth surface varies. Typically, when the movable body 110 is located in the first position with respect to the main body 120, the area of the engaging face between the third surface and the fourth surface becomes maximum.

In a further embodiment, the movable body 110 is also able to rotate in the third plane. The third plane is perpendicular to the first plane and the second plane respectively. The first surface has a long side parallel to the third plane. In an example, FIG. 9 shows schematically the rotation of the movable body 110 in the third plane.

The electronic device according to the embodiment may allow the movable body 110 to rotate in the second plane and the third plane with respect to the main body 120 respectively. In this way, apparently, the movable body 110 has a large moving scope and further increases the postures of the electronic device. The second plane in the first direction is perpendicular to the first plane. The third plane in the second direction is perpendicular to the first plane. The first direction and the second direction are perpendicular to each other in the second plane.

Fourteenth Embodiment of the Electronic Device

Figure 9:
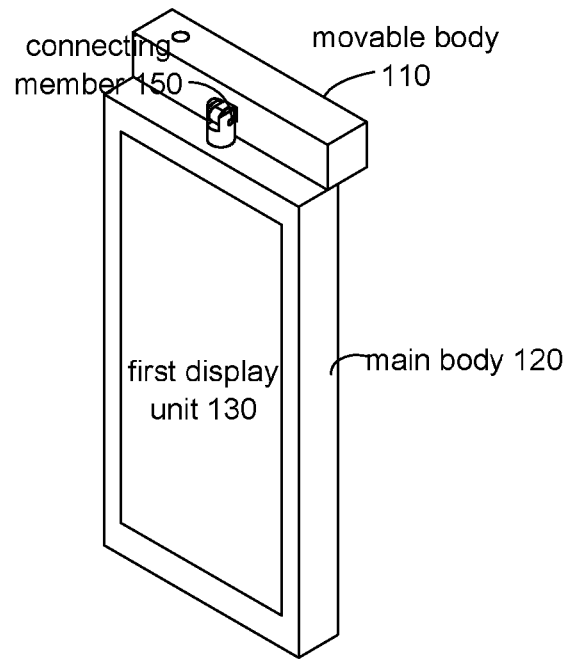
FIG. 9 is a schematic view showing a seventh structure of an electronic device according to an embodiment of the present disclosure.

As illustrated in FIGS. 8-9, for example, FIG. 8, an embodiment of the present disclosure provides an electronic device. The electronic device includes: a movable body 110 and a main body 120, the movable body 110 being provided with at least one functional unit therein, the main body 120 comprising a first surface provided with a first display unit 130, the movable body 110 comprising a second surface and a fourth surface. The movable body 110 is movable from a first position to a second position with respect to the main body 120. The first surface and the second surface are both located in a first plane when the movable body 110 is located in the first position with respect to the main body 120. The movable body 110 can rotate in the second plane. The fourth surface is located in a second plane all along when the movable body 110 moves in the second plane with respect to the main body 120, the second plane being perpendicular to the first plane. An intersection line of the second plane and the first plane is parallel to a short side of the first surface.

A connecting member which allows the movable body 110 to rotate with respect to the main body 120 is provided between the movable body 110 and the main body 120, the connecting member having a rotation axis perpendicular to the first plane.

The connecting member includes a first portion which makes the movable body 110 rotate in the second plane with respect to the main body 120, the rotation axis of the first portion being perpendicular to the first plane.

The connecting member includes a second portion which makes the movable body 110 rotate in the second plane with respect to the main body 120, the rotation axis of the second portion being perpendicular to the first plane.

The first portion in the first direction is perpendicular to the first plane. The second portion in the second direction is perpendicular to the first plane. The first direction and the second direction are perpendicular to each other in the first plane.

As an example, the connecting member according to the embodiment includes a first pivot and a second pivot as described in the above embodiment. The second pivot is arranged on the first pivot, for rotation of the movable body in the third plane with respect to the main body. The first pivot is the first portion and the second pivot is the second portion.

When the position of the first pivot is maintained constantly, the second pivot is rotated to allow the movable body to rotate in the third plane.

In the embodiment, the movable body 110 and the main body 120 are arranged in a fixed manner or in a movable manner, so as to form certain spacing between the movable body 110 and the main body 120 in a plane parallel to the first plane. In this way, when the movable body 110 rotates in the third plane, it can rotate over a larger angle.

As an example, the spacing between the movable body 110 and the main body 120 includes a first spacing and a second spacing. When the spacing between the movable body 110 and the main body 120 is the first spacing, the adjacent faces of the movable body 110 and the main body 120 may even contact with each other. However, the faces of the movable body 110 and the main body 120 contacting with each other are both smooth faces. In this way, it may facilitate rotation of the movable body 110 in the second plane with respect to the main body. When the spacing between the movable body 110 and the main body 120 is the second spacing, the adjacent faces of the movable body 110 and the main body 120 may be separated from each other. And the first spacing may allow the movable body to rotate at 90-180 degrees in third plane with respect to the main body 120.

In an example, the movable body 110 and the main body 120 may be connected movably by the above first pivot and second pivot, or may be connected only by a ball pivot. Apparently, the ball pivot rotates at 360 degrees if the space permits, the ball pivot in the embodiment may include two parts, i.e., a first ball housing and a second ball housing. The ball housing is connected to the main body 120. The second housing is secured to the movable body 110 by components such as a connecting shaft. In the second plane, the movable body 110 may achieve a maximum rotation angle of 360 degrees by movement of the second ball housing with respect to the first ball housing.

As regard to the movement of the movable body 110 in the third plane with respect to the main body 120, it is classified into two cases.

Case 1: the first ball housing is an outer ball housing and the second ball housing is an inner ball housing located within the outer ball housing.

An arc-shaped groove for swing of the connecting shaft may be provided on the first ball housing in the third rotation plane. In this way, when the movable body 110 moves in the third plane, the connecting shaft moves in the arc-shaped groove as the second ball housing moves, so as to achieve movement of the movable body 110 in the second plane with respect to the main body 120.

Case 2: the first ball housing is an inner ball housing and the second ball housing is an outer ball. In this way, the first ball housing may be connected to the main body 120 for example by hinge joint. By mean of the joint rotation of the first ball housing and the second ball housing in the third plane, the movable body 110 can rotate in the third plane with respect to the main body 120.

In the embodiment, on the basis of the previous embodiment, it provides an electronic device, which further increases the moving range of the movable body 110 with respect to the main body 120. Thus, the postures of the electronic device are added again.

Fifteenth Embodiment of the Electronic Device

Figure 10:
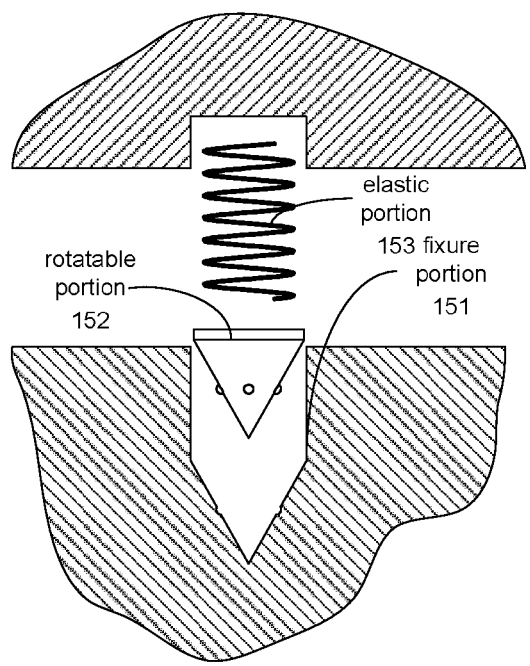
FIG. 10 is a schematic view showing a structure of a connecting member of an electronic device according to an embodiment of the present disclosure.

As illustrated in FIGS. 9-10, an embodiment of the present disclosure provides an electronic device. The electronic device includes: a movable body 110 and a main body 120, the movable body 110 being provided with at least one functional unit therein, the main body 120 comprising a first surface provided with a first display unit 130, the movable body 110 comprising a second surface. The movable body 110 is movable from a first position to a second position with respect to the main body 120. The first surface and the second surface are both located in a first plane when the movable body 110 is located in the first position with respect to the main body 120. The movable body 110 and the main body 120 are connected movably by a connecting member 150. The connecting member comprises a fixture component 151, a rotatable component 152 and an elastic component 153.

The rotatable component 152 is capable of rotating with respect to the fixture component 151 to allow the movable body 110 to rotate with respect to the main body 120.

The elastic component 153 is configured to hold a relative position relation between the rotatable component 152 and the fixture component 151.

In the embodiment, the movable body 110 may rotate at least in the second plane with respect to the rotatable component 152.

The elastic component 153 may be a structure such as springs or elastic plastic rubber. The elastic component 153 may apply a pressure along a direction parallel to a rotation axis to maintain the relative position relation between the fixture component 151 and the rotatable component 152. For example, when the movable body 110 does not rotate with respect to the main body 120, the elastic component 153 is configured to apply a pressure to the movable body 152 to maintain the relative position relation between the fixture component 151 and the rotatable component 152.

The embodiment provides an electronic device which divided into the movable body 110 and the main body 120. Such two parts can rotate by the connecting member at least in the second plane, so as to diversify the postures of the electronic device.

Sixteenth Embodiment of the Electronic Device

As illustrated in FIGS. 9-10, an embodiment of the present disclosure provides an electronic device. The electronic device includes: a movable body 110 and a main body 120, the movable body 110 being provided with at least one functional unit therein, the main body 120 comprising a first surface provided with a first display unit 130, the movable body 110 comprising a second surface. The movable body 110 is movable from a first position to a second position with respect to the main body 120, the main body 120 comprising a first surface provided with a first display unit 130, the movable body 110 comprising a second surface. The first surface and the second surface are both located in a first plane when the movable body 110 is located in the first position with respect to the main body 120. The movable body 110 and the main body 120 are connected movably by a connecting member 150. The connecting member comprises a fixture component 151, a rotatable component 152 and an elastic component 153.

The rotatable component 152 is capable of rotating with respect to the fixture component 151 to allow the movable body 110 to rotate with respect to the main body 120.

The elastic component 153 is configured to hold a relative position relation between the rotatable component 152 and the fixture component 151.

The fixture component 151 is connected to the main body 120, and the rotatable component 152 is connected to the movable body 110.

The rotatable component 152 is able to rotate in the second plane with respect to the fixture component 151, the second plane being perpendicular to the first plane.

The fixture component 151 is connected to the main body 120. The connection may be a fixed connection herein. The connection of the rotatable component 152 and the movable body 110 may be a fixed connection or a movable connection herein. However, such movable connection has a limited scope. Typically, the rotatable component 152 is connected indirectly to the movable body by the elastic component 153.

As shown in figures, in summary, such connection may achieve the rotation of the movable body 110 in the second plane with respect to the main body 120.

The embodiment, on the basis of the previous embodiment, further determines connection relations between various components in the connecting member and other components in the electronic device. Apparently, connection of the movable body in the embodiment is achieved by such connecting member, and has advantages of simple structure, stable connection or the like.

Seventeenth Embodiment of the Electronic Device

As illustrated in FIGS. 9-10, an embodiment of the present disclosure provides an electronic device. The electronic device includes: a movable body 110 and a main body 120, the movable body 110 being provided with at least one functional unit therein, the main body 120 comprising a first surface provided with a first display unit 130, the movable body 110 comprising a second surface. The movable body 110 is movable from a first position to a second position with respect to the main body 120, the main body 120 comprising a first surface provided with a first display unit 130, the movable body 110 comprising a second surface (重复). The first surface and the second surface are both located in a first plane when the movable body 110 is located in the first position with respect to the main body 120. The movable body 110 and the main body 120 are connected movably by a connecting member 150. The connecting member comprises a fixture component 151, a rotatable component 152 and an elastic component 153.

The rotatable component 152 is capable of rotating with respect to the fixture component 151 to allow the movable body 110 to rotate with respect to the main body 120.

The elastic component 153 is configured to hold a relative position relation between the rotatable component 152 and the fixture component 151.

The rotatable component 152 is provided with a first engagement component thereon, the fixture component 151 being provided with a second engagement component matched with the first engagement component.

The elastic component 153 is configured to apply a first pressure to the fixture component when the first engagement component is engaged with the second engagement component and is configured to apply a second pressure to the fixture component when the first engagement component is disengaged from the second engagement component, the first pressure being less than the second pressure.

In the embodiment, whether the first engagement component is engaged with the second engagement component or the first engagement component is disengaged from the second engagement component, the elastic component 153 is in a compression state or deformation state. Their difference is that the elastic component has greater compression amount or deformation amount so as to cause greater second pressure when the first engagement component is disengaged from the second engagement component. When the first engagement component is engaged with the second engagement component, due to the engagement between the first engagement component and the second engagement component, if the relative position relation between the rotatable component and the fixture component changes, such engagement must be removed. Obviously, it may need greater external forces. Thus, when the first engagement component is engaged with the second engagement component, the movable body and the main body form very stable connection. In this way, the position relation between the movable body and the main body can be maintained stably.

In the embodiment, the first engagement component and the second engagement component may be engaged by a protrusion and a recess. While the first engagement component is a recess which is arranged on the fixture component 151 and dents towards a central position of the main body 120, the second engagement component arranged on the rotatable component 152 is a protrusion which is arranged on the fixture component and projects towards the central position of the main body 120. While the first engagement component is a protrusion which is arranged on the fixture component and projects away from the central position, the second engagement component may be a recess which is arranged on the rotatable component and dents towards the movable body.

In a further embodiment, when the movable body 110 is located in the second position with respect to the main body 120, the movable body 110 has an end portion which is able to support the main body. And when the end portion of the movable body 110 supports the main body 120, at least two support postures as shown in FIGS. 1 and 2 are formed.

Eighteenth Embodiment of the Electronic Device

As illustrated in FIGS. 9-10, an embodiment of the present disclosure provides an electronic device. The electronic device includes: a movable body 110 and a main body 120, the movable body 110 being provided with at least one functional unit therein, the main body 120 comprising a first surface provided with a first display unit 130, the movable body 110 comprising a second surface. The movable body 110 is movable from a first position to a second position with respect to the main body 120, the main body 120 comprising a first surface provided with a first display unit 130, the movable body 110 comprising a second surface. The first surface and the second surface are both located in a first plane when the movable body 110 is located in the first position with respect to the main body 120. The movable body 110 and the main body 120 are connected movably by a connecting member 150. The connecting member comprises a fixture component 151, a rotatable component 152 and an elastic component 153.

The rotatable component 152 is capable of rotating with respect to the fixture component 151 to allow the movable body 110 to rotate with respect to the main body 120.

The elastic component 153 is configured to hold a relative position relation between the rotatable component 152 and the fixture component 151.

The rotatable component 152 is provided with a first engagement component thereon, the fixture component 151 being provided with a second engagement component matched with the first engagement component.

The elastic component 153 is configured to apply a first pressure to the fixture component when the first engagement component is engaged with the second engagement component and is configured to apply a second pressure to the fixture component when the first engagement component is disengaged from the second engagement component, the first pressure being less than the second pressure.

The first engagement component is a protrusion and the second engagement component is a recess; or the first engagement component is a recess and the second engagement component is a protrusion.

As an example, there are m recesses that are arranged dispersedly on the fixture component or the rotatable component, and there are n protrusions that are arranged dispersedly on the rotatable component or the fixture component.

n and m are both integers not less than 1, and n is less than m.

The n protrusions are located in n recesses when the first engagement component is engaged with the second engagement component. At least one of the n protrusions is located out of the recesses when the engagement component is disengaged from the second engagement component.

The angle formed, in the second plane perpendicular to the first plane, by the movable body with respect to the main body varies as the position at which the first engagement component is engaged with the second engagement component varies.

In an example, the fixture component 151 is provided with four recesses distributed at equal angle interval. The rotatable component 152 is provided with a protrusion which is able to be in engagement with the recesses. In this way, the protrusion may be engaged with four dispersed recesses. When the protrusion is engaged with different recesses, the movable body 110 crosses with the main body 120 at different angles respectively.

By means of the engagement and disengagement between the first engagement component and the second engagement component, the movable body may be fixed stably at different positions with respect to the main body, so as to form a plurality of postures with different crossing angles.

Nineteenth Embodiment of the Electronic Device

As illustrated in FIG. 3 or 4, the embodiment provides an electronic device. The electronic device includes: a movable body 110 and a main body 120, the movable body 110 being provided with at least one functional unit therein, the main body 120 comprising a first surface provided with a first display unit 130, the movable body 110 comprising a second surface.

The movable body 110 is movable from a first position to a second position with respect to the main body 120.

The first surface and the second surface are both located in a first plane when the movable body 110 is located in the first position with respect to the main body 120.

The movable body 110 has an end portion configured to support the main body 120 when the movable body 110 is located in the second position with respect to the main body.

In the embodiment, the movable body 110 has a shape of strip, for example, cylinder, cube or ellipsoid. A surface of the movable body 110 having the shape of strip may include two end surfaces and a side face connecting the two end surfaces. Typically, at least one of the side faces is an integral part of the second surface. The end surfaces may be located in a surface of the two end portions of the shape of strip which is perpendicular to the second surface. The position of the end surface is the end portion of the movable body 110 having the shape of strip.

The electronic device according to the embodiment includes the movable body 110 and the main body 120 that can move with respect to each other. The end portion of the movable body 110 can support the main body. The posture of the movable body 110 supporting the main body 120 may be shown in FIG. 3 or 4.

The functional unit arranged on the movable body 110, in an example, may be a structure such as fingerprint identifying unit arranged at the end portions of the movable body. The movable body 110 includes two end portions. When one of the two end portions supports the main body 120, the suspending end portion of the movable body 110 is exposed. In this way, if it needs to the electronic device to be paying money and needs to determine the fingerprint of the user, the fingerprint of the user may be scanned by the fingerprint identifying unit on the exposed end portions.

In a further embodiment, the long side of the second surface is not less than ½ of the short side of the first surface and not greater than the short side of the first surface. In the first embodiment of the electronic device, the length of the long side of the second surface is identical to the length of the short side of the first surface. In the embodiment, the long side of the second surface is only greater than ½ of the long side of the first surface. At the same time, the end portions of the movable body 110 is also configured such that at least one of the two end portions of the movable body 110 may support the main body when the movable body 110 crosses with the main body 120 in the second plane perpendicular to the plane in which the first surface and the second surface are arranged.

Twentieth Embodiment of the Electronic Device

Figure 11:
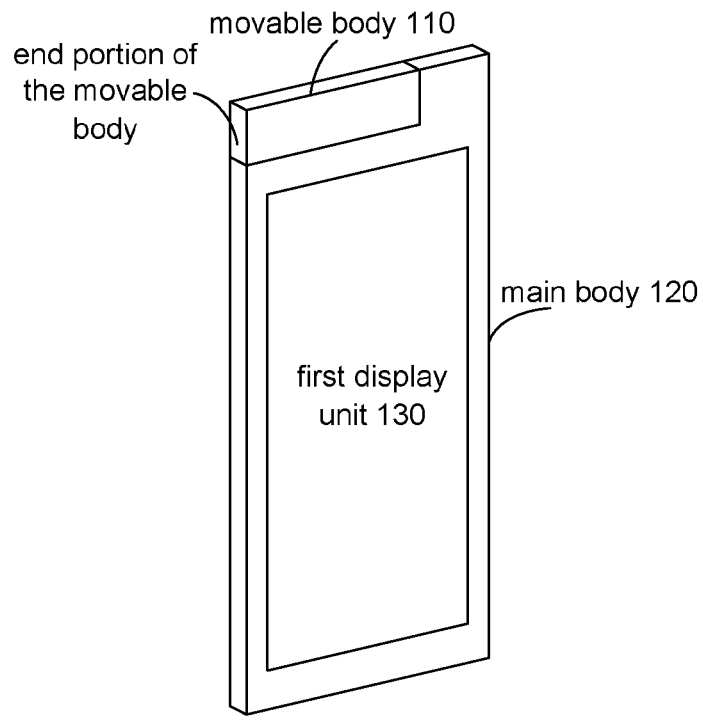
FIG. 11 is a schematic view showing an eighth structure of an electronic device according to an embodiment of the present disclosure.
Figure 12:
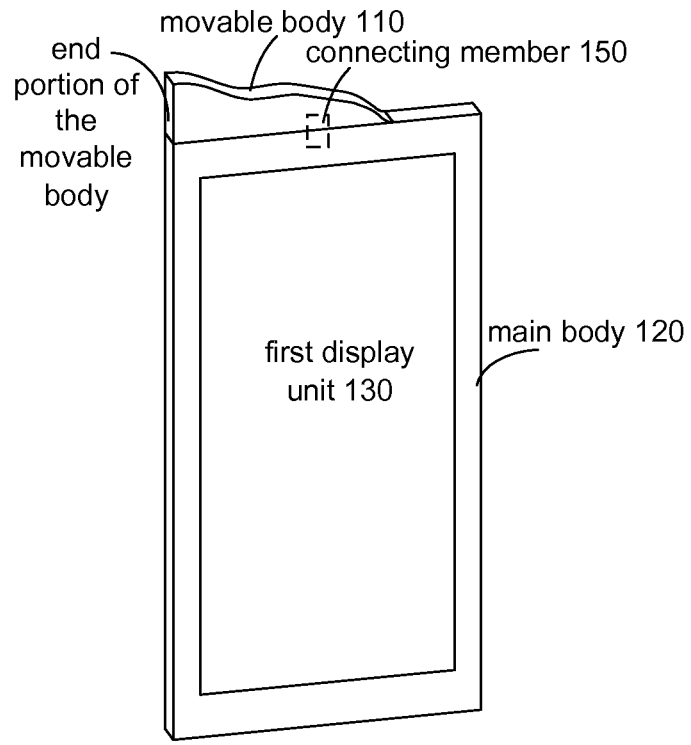
FIG. 12 is a schematic view showing a ninth structure of an electronic device according to an embodiment of the present disclosure.

As illustrated in FIG. 11 or 12, the embodiment provides an electronic device. The electronic device includes:

a movable body 110 in which at least one functional unit is arranged and a main body 120, the main body 120 comprising a first surface provided with a first display unit 130, the movable body comprising a second surface.

The movable body 110 is movable from a first position to a second position with respect to the main body.

The first surface and the second surface are both located in a first plane when the movable body 110 is located in the first position with respect to the main body.

The movable body 110 has an end portion which is configured to support the main body when the movable body 110 is located in the second position with respect to the main body.

The second surface has a long side which is not less than ½ of a short side of the first surface and not greater than the short side of the first surface. The electronic device further comprises a connecting member, which is connected to the movable body 110 and the main body 120 respectively at an intermediate position of the short side of the second surface. The movable body 110 rotates in a second plane perpendicular to the first plane with respect to the main body 120, by means of the connecting member.

In the embodiment, in order to allow the movable body 110 to support the main body 120 stably, the connecting member 150 of the movable body 110 and the main body 120 is arranged at the intermediate position of the short side of the second surface. In this arrangement, as the long side of the second surface of the movable body 110 is less than the short side of the first surface of the main body 120. Apparently, the connecting member will divide the movable body 110 unequally.

The movable body 110 includes two end portions. The distance between the connecting member and one end portion of the movable body is a third distance while the distance between the connecting member and the other end portion of the movable body is a fourth distance. The third distance will not equal to the fourth distance.

As illustrated in FIG. 4, the movable body 110 is an irregular column, for example a wedge-shaped column. The irregular column not only includes the second surface, but also may include a first end surface and two side faces. One side face is a plane adjacent to of adjoining the main body, the other side face may be a curve surface. The curve surface is adjacent to and connected to the second surface and the plane respectively, so as to constitute the side faces of the movable body 110.

The irregular column may be connected to the main body 120 by the connecting member such as rotation shaft at the intermediate position of the short side of the second surface of the main body 120. The first end surface may be configured to support the main body.

When the movable body 110 is located in the first position with respect to the main body, the second surface of the movable body 110 and the first surface of the main body 120 are located in the same plane. The electronic device becomes one streamline curve surface in the end surface at the end provided with the movable body 110.

Apparently, by means of the arrangement of the movable body 110 and the main body 120, the electronic device in the embodiment changes the monotonous and inflexible characteristic of structure in the conventional electronic device, and corresponds to at least two postures.

Twenty-First Embodiment of the Electronic Device

Figure 13:
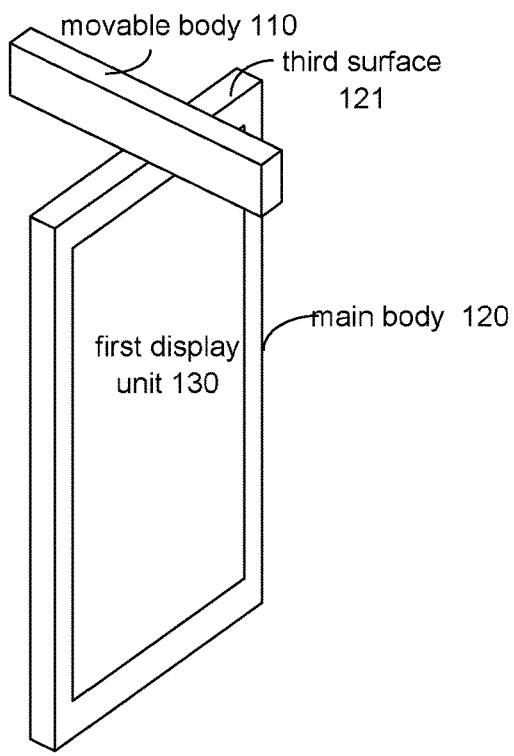
FIG. 13 is a schematic view showing a tenth structure of an electronic device according to an embodiment of the present disclosure.

As illustrated in FIG. 13, the embodiment provides an electronic device. The electronic device includes: a movable body 110, a main body 120 and a connecting member 160 by which the movable body 110 is connected to the main body 120. The relative position relation between the movable body 110 and the main body 120 may be changed by the connecting member 160.

The movable body 110 is provided with at least one functional unit therein.

The main body 120 comprises a first surface provided with a first display unit and a third surface 121, the movable body 110 comprising a second surface and a fourth surface.

The movable body 110 is movable from a first position to a second position with respect to the main body 120.

When the movable body 110 is located in the first position with respect to the main body, the engagement area of the third surface and the fourth surface has maximum value and the first surface and the second surface are both located in the first plane.

The engagement area of the third surface and the fourth surface is less than the maximum value when the movable body 110 is located in the second position with respect to the main body.

The third surface 121 and the fourth surface are both perpendicular to the first plane, the third surface being provided with at least one functional unit.

In the embodiment, the electronic device not only includes the movable body 110 and the main body 120, but also provides a functional unit on the surface adjacent to the movable body 110 and the main body 120. The functional unit may include such as an image capturing unit, a light emitting unit or a USB interface unit arranged on the fourth surface.

All of these functional units have two states. When the movable body 110 is located in the first position with respect to the main body 120, all of the functional units are hidden. When the movable body 110 is located in the second position with respect to the main body 120, all of the functional units are exposed.

In the embodiment, one of the movable body 110 and the main body 120 is used masterly as a protect sleeve or a hidden cover arrangement of the functional unit. In this way, it can ensure the functional unit may be protected well when it is not used.

In an example, the USB interface unit is arranged on the third surface or the fourth surface. When the USB interface unit is not activated, in order to prevent foreign matters such as dusts from blocking the USB interface unit or prevent the air from oxidizing it, in the embodiment, the movable body may be located in the first position by rotating it. In this way, the USB interface unit may be hidden and protected.

Twenty-Second Embodiment of the Electronic Device

Figure 14:
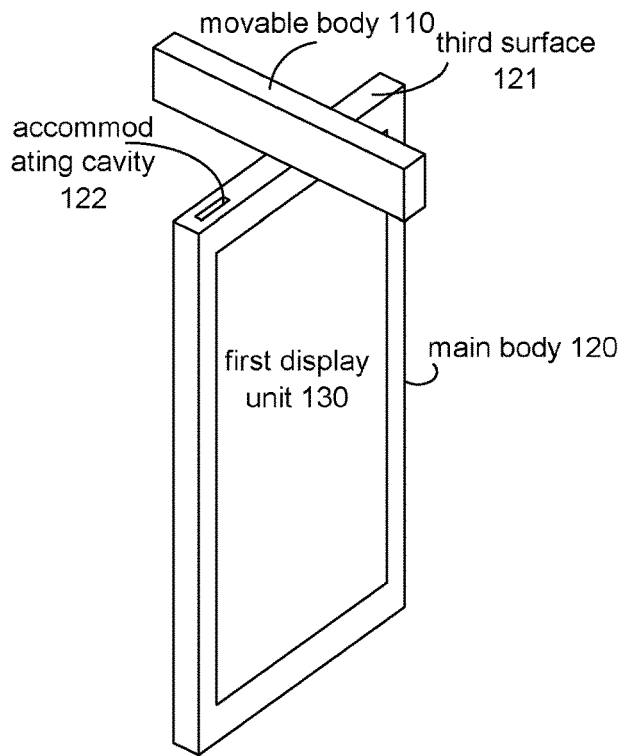
FIG. 14 is a schematic view showing an eleventh structure of an electronic device according to an embodiment of the present disclosure.

As illustrated in FIG. 13 or 14, the embodiment provides an electronic device. The electronic device includes: a movable body 110 and a main body 120. The movable body 110 is provided with at least one functional unit therein.

The main body 120 comprises a first surface provided with a first display unit and a third surface 121, the movable body 110 comprising a second surface and a fourth surface.

The movable body 110 is movable from a first position to a second position with respect to the main body 120.

When the movable body 110 is located in the first position with respect to the main body, the engagement area of the third surface and the fourth surface has maximum value and the first surface and the second surface are both located in the first plane.

The engagement area of the third surface and the fourth surface is less than the maximum value when the movable body 110 is located in the second position with respect to the main body.

The third surface 121 and the fourth surface are both perpendicular to the first plane, the third surface being provided with at least one functional unit.

As shown in FIG. 14, the third surface is provided with an accommodating cavity 122 which is concave towards inside of the main body 110. The accommodating cavity is hidden when the movable body 110 is located in the first position with respect to the main body while it is exposed when the movable body 110 is located in the second position with respect to the main body. A third functional unit is mounted movably in the accommodating cavity.

Such accommodating cavity may be configured to mount SIM cards or USIM cards. The SIM cards may be Subscriber Identity Module. The USIM cards may be Universal Subscriber Identity Module. The accommodating cavity may also be used to mount memory cards, such as TFT cards or SD cards. In this case, the third functional unit may be such as the SIM cards or USIM cards, TFT cards or SD cards.

Apparently, with the electronic device in the embodiment, the SIM cards, USIM cards or memory cards may be mounted without detaching the electronic device.

In practice, the accommodating cavity may be mounting slots for various memory banks. In this way, the user may directly extend the memory by himself without going to a maintenance station after he purchases the electronic device. The accommodating cavity may be mounting slots for assistant-chips. Connecting pins are preset in the accommodating cavity. After the assistant-chips are mounted into the accommodating cavity, they may achieve signal communication with the master chips in the main body.

The assistant-chips may be electronic chips having power consumption lower than that of the master chips. When the master chips rest, the assistant-chips may do some works with low power consumption. As an example, when the electronic device is a cell phone, if the cell phone counts the paces of the user walking in the rest state, the master chips of the cell phone may rest, but the assistant-chips may become in work state to count the paces.

Twenty-Third Embodiment of the Electronic Device

As illustrated in FIG. 13, the embodiment provides an electronic device. The electronic device includes: a movable body 110 and a main body 120. The movable body 110 is provided with at least one functional unit therein.

The main body 120 comprises a first surface provided with a first display unit and a third surface 121, the movable body 110 comprising a second surface and a fourth surface.

The movable body 110 is movable from a first position to a second position with respect to the main body 120.

When the movable body 110 is located in the first position with respect to the main body, the engagement area of the third surface and the fourth surface has maximum value and the first surface and the second surface are both located in the first plane.

The engagement area of the third surface and the fourth surface is less than the maximum value when the movable body 110 is located in the second position with respect to the main body.

The third surface 121 and the fourth surface are both perpendicular to the first plane, the third surface being provided with at least one functional unit.

The functional unit arranged on the third surface comprises a sensing unit 170 which is configured to determine the engagement area between the third surface and the fourth surface.

In the embodiment, the sensing unit 170 may be a pressure sensor. When the movable body 110 is located in the first position, the pressure sensor is squeezed in entirety. At that time, the sensed pressure is maximum. In this circumstance, the engagement area between the third surface and the fourth surface may be considered to have maximum area. When the movable body 110 crosses with the main body 120 in the second plane perpendicular to the first plane at angle of 90 degrees, the squeezed portion of the pressure sensor is minimum and the sensed pressure is minimum.

As an example, the pressure sensor may be an elastic pressure sensor which is arranged on the third surface and projects slightly towards the movable body.

The sensing unit in the embodiment also may be a photosensitive sensing unit. In summary, when the electronic device is applied in an illumination environment. The larger the engagement area becomes, the lower the brightness of the environmental light sensed by the photosensitive sensing unit becomes. In contrast, the smaller the engagement area becomes, the higher the brightness of the environmental light sensed by the photosensitive sensing unit becomes. In practice, the sensing unit may comprise a plurality of photosensitive sensors arranged at different positions on the third surface, respectively. The angle of the movable body 110 with respect to the main body 120 is determined on the basis of the difference of the brightness of the environmental light sensed by the photosensitive sensors.

Twenty-Fourth Embodiment of the Electronic Device

As illustrated in FIG. 13, the embodiment provides an electronic device. The electronic device includes: a movable body 110 and a main body 120. The movable body 110 is provided with at least one functional unit therein.

The main body 120 comprises a first surface provided with a first display unit and a third surface 121, the movable body 110 comprising a second surface and a fourth surface.

The movable body 110 is movable from a first position to a second position with respect to the main body 120.

When the movable body 110 is located in the first position with respect to the main body, the engagement area of the third surface and the fourth surface has maximum value and the first surface and the second surface are both located in the first plane.

The engagement area of the third surface and the fourth surface is less than the maximum value when the movable body 110 is located in the second position with respect to the main body.

The third surface and the fourth surface are both perpendicular to the first plane, the third surface being provided with at least one functional unit.

The functional unit arranged on the third surface comprises an interface unit.

The interface unit is hidden when the movable body is located in the first position with respect to the main body while it is exposed when the movable body is located in the second position with respect to the main body. The interface unit is configured to interchange information with other electronic device when the interface unit is exposed.

The interface unit may be a USB interface unit herein. In an example, it may be a USB interface unit for insertion of a USB plug therein.

The interface unit may also be other interface units, for example, a mini-printer interface. If the electronic device is a cell phone, when the cell phone is applied in an environment without network, connection lines of the printer may be inserted into the interface unit to achieve connection between the cell phone and the printer. Herein, the printer is the above other electronic device.

Twenty-Fifth Embodiment of the Electronic Device

As illustrated in FIGS. 1-14, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side identical to a length of a short side of the first surface.

The first surface and the second surface are both located in a first plane when the movable body is located in the first position with respect to the main body.

The operation modes of the electronic device comprise a first operation mode and a second operation mode.

The electronic device operates in the first operation mode when the movable body 110 is located in the first position with respect to the main body while the electronic device operates in the second operation mode when the movable body is located in the second position with respect to the main body.

The electronic device provided by the embodiment comprises the movable body 110 and the main body 120 that are able to move with respect to each other. The electronic device also has at least two operation modes. In the embodiment, the electronic device will switch its operation modes on the basis of the mutual position relation of the movable body 110 and the main body 120.

In the embodiment, when the movable body 110 is located in the first position, the electronic device is in the first operation mode. The first position described in the embodiment may refer to the position of the electronic device described in the Embodiments of the electronic device or FIG. 1. When the movable body 110 is located in the second position, the electronic device is in the second operation mode. In the second position, the movable body 110 may cross with the main body 120 in the second plane.

The first operation mode is different from the second operation mode. In an example, the events that the electronic device is able to respond may be divided on the basis of the security levels of the responsive events. Some responsive events in high security level only can be achieved in one of the first operation mode and the second operation mode. In practice, the difference between the first operation mode and the second operation mode is not limited to the above.

In summary, the embodiment provides an electronic device. It includes the movable body and the main body that can rotate with respect to each other. And the electronic device may determine its operation modes on the basis of the relative position relation of the movable body and the main body. Apparently, the movable body and the main body of the electronic device correspond to different postures of the electronic device. The different postures of the electronic device may correspond to different application scenes. At that time, if the electronic device uses the corresponding operation mode, the requirements of the user will be met more suitably.

Twenty-Sixth Embodiment of the Electronic Device

As illustrated in FIGS. 1-14, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side identical to a length of a short side of the first surface.

The first surface and the second surface are both located in a first plane when the movable body is located in the first position with respect to the main body.

The operation modes of the electronic device comprise a first operation mode and a second operation mode.

The electronic device operates in the first operation mode when the movable body 110 is located in the first position with respect to the main body while the electronic device operates in the second operation mode when the movable body is located in the second position with respect to the main body.

The first operation mode and the second operation mode may be distinguished from each other in many manners. Several options are provided as follows.

Option 1:
The electronic device has power consumption in the first operation mode less than its power consumption in the second operation mode.

Option 2:
The electronic device has responsive events in the first operation mode which are greater than its responsive events in the second operation mode.

Option 3:
The electronic device has first type of responsive events and second type of responsive events. In the second operation mode, the electronic device is able to respond to the first type of responsive events while shielding the second type of responsive events. And in the first operation mode, the electronic device is able to respond to the second type of responsive events.

As a further embodiment of Option 3, the second type of responsive events comprises the responsive events for detecting movement states of the electronic device.

When the movable body 110 is located in the second position with respect to the main body 120, the end portion of the movable body 110 may support the electronic device. At that time, the electronic device may be maintained on the support face in an inclined or upright sate. The electronic device will not move as the user moves.

In an example, a first application runs in the electronic device. The first application is configured to count the running speed, paces of running or walking of the user. The application is determined by detecting the movement of the electronic device along with the movement of the user. If the electronic device is supported on the table at that time, the first application may rest apparently to save the power consumption of the electronic device such that the second type of responsive events corresponding to the first application may include the responsive events for detecting the movement states of the electronic device.

In view of the above, the electronic device in the embodiment further specifies the distinction between the first operation mode and the second operation mode, on the basis of the previous embodiment, however, the distinction is not limited to those in the above embodiments.

Twenty-Seventh Embodiment of the Electronic Device

As illustrated in FIGS. 1-14, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side identical to a length of a short side of the first surface.

The first surface and the second surface are both located in a first plane when the movable body is located in the first position with respect to the main body.

The operation modes of the electronic device comprise a first operation mode and a second operation mode.

The electronic device operates in the first operation mode when the movable body 110 is located in the first position with respect to the main body while the electronic device operates in the second operation mode when the movable body is located in the second position with respect to the main body.

The electronic device further has a third operation mode.

The electronic device also may operate in the third operation mode when the movable body 110 is located in the second position with respect to the main body 120.

The electronic device in the embodiment not only may operate in the first operation mode and the second operation mode, but also may operate in the third operation mode. When the movable body 110 is located in the second position with respect to the main body, the electronic device can operate in the third operation mode.

The third operation mode is different from the first operation mode and the second operation mode.

On the basis of the previous embodiment, the embodiment provides an electronic device that may operate in at least three operation modes. When the movable body is located in the second position with respect to the main body, the electronic device may operate in the second operation mode and the three operation mode. Apparently, the electronic device corresponds to different operation modes depending on different postures, so as to adapt different scenes in different postures and improve the intelligence of the electronic device and the user's experiences.

Twenty-Eighth Embodiment of the Electronic Device

As illustrated in FIGS. 1-14, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side identical to a length of a short side of the first surface.

The first surface and the second surface are both located in a first plane when the movable body is located in the first position with respect to the main body.

The operation modes of the electronic device comprise a first operation mode and a second operation mode.

The electronic device operates in the first operation mode when the movable body 110 is located in the first position with respect to the main body while the electronic device operates in the second operation mode when the movable body is located in the second position with respect to the main body.

The electronic device further has a third operation mode.

The electronic device may also operate in the third operation mode when the movable body 110 is located in the second position with respect to the main body 120.

The electronic device in the embodiment not only may operate in the first operation mode and the second operation mode, but also may operate in the third operation mode. When the movable body 110 is located in the second position with respect to the main body, the electronic device can operate in the third operation mode.

As shown in FIG. 3, the movable body 110 has a first posture and a second posture when it is located in the second position with respect to the main body 120. In the first posture, the movable body 110 is located in the second position with respect to the main body and a first portion of the movable body 110 and a second portion of the main body 120 are able to support the electronic device, and the electronic device operates in the second operation mode.

As shown in FIG. 4, in the second posture, the movable body 110 is located in the second position with respect to the main body 120 and a first portion of the movable body and a third portion of the main body are able to support the electronic device, and the electronic device operates in the third operation mode.

In the embodiment, the movable body 110 typically has a shape of strip. Generally, the first portion of the movable body 110 is the end portion of the movable body 110.

The second portion of the main body is different from the third portion of the main body. In the embodiment, the second portion may be the portion the long side of the first surface is located. The third portion may be the portion the short side of the first surface is located. In practice, the second portion and the third portion may also be other portions of the main body 120 as long as they are distinguished from each other.

In an example, the electronic device may also include a controlling unit. As an example, the controlling unit may include such as a processor or a process chip. It may control the operation modes in which the electronic device operates by itself according to the relative position of the movable body 110 and the main body 120 and the postures of the electronic device.

Apparently, on the basis of the previous embodiment, the electronic device in the embodiment forms different postures and corresponds to different operation modes when the movable body 110 is located in the second position with respect to the main body 120. Apparently, it can intelligently meet the requirements of work scenes in different postures.

Twenty-Ninth Embodiment of the Electronic Device

As illustrated in FIGS. 1-14, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side equal to or not less than ½ of a length of a short side of the first surface.

The first surface and the second surface are both located in a first plane when the movable body 110 is located in the first position with respect to the main body 120.

The operation modes of the electronic device comprise a first operation mode and a second operation mode.

The electronic device operates in the first operation mode when the movable body 110 is located in the first position with respect to the main body 120 while the electronic device operates in the second operation mode when the movable body 110 is located in the second position with respect to the main body 120.

The electronic device further has a third operation mode.

The electronic device may also operate in the third operation mode when the movable body 110 is located in the second position with respect to the main body 120.

The electronic device in the embodiment not only may operate in the first operation mode and the second operation mode, but also may operate in the third operation mode. When the movable body 110 is located in the second position with respect to the main body 120, the electronic device can operate in the third operation mode.

As shown in Figures, the movable body 110 has a first posture and a second posture when it is located in the second position with respect to the main body 120. In the first posture, the movable body 110 is located in the second position with respect to the main body and a first portion of the movable body 110 and a second portion of the main body 120 are able to support the electronic device, and the electronic device operates in the second operation mode. In the second posture, the movable body 110 is located in the second position with respect to the main body 120 and the first portion of the movable body 110 and a third portion of the main body 120 can support the electronic device. The electronic device operates in the third operation mode.

In the second operation mode, the first display unit is in a landscape display mode in which a display region of the first display unit has a display width in a first direction greater than a display width in a second direction, the first direction being parallel to the horizontal direction, the second direction being perpendicular to the first direction. In this case, the second portion of the main body 120 is typically the portion on which the long side of the first surface is located.

In the first posture, as the first display unit is arranged horizontally, use of horizontal display more conforms to the vision customs of the user. It is more important that use of the horizontal display can utilize the display area of the first display unit more sufficiently such that more plentiful information can be displayed in the limited display area.

Thirtieth Embodiment of the Electronic Device

As illustrated in FIGS. 1-14, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side equal to or not less than ½ of a length of a short side of the first surface.

The first surface and the second surface are both located in a first plane when the movable body is located in the first position with respect to the main body 120.

The operation modes of the electronic device comprise a first operation mode and a second operation mode.

The electronic device operates in the first operation mode when the movable body 110 is located in the first position with respect to the main body while the electronic device operates in the second operation mode when the movable body 110 is located in the second position with respect to the main body.

The electronic device further has a third operation mode.

The electronic device may also operate in the third operation mode when the movable body 110 is located in the second position with respect to the main body 120.

The electronic device in the embodiment not only may operate in the first operation mode and the second operation mode, but also may operate in the third operation mode. When the movable body 110 is located in the second position with respect to the main body 120, the electronic device can operate in the third operation mode.

As shown in FIGS. 3-4, the movable body 110 has a first posture and a second posture when it is located in the second position with respect to the main body 120. In the first posture, the movable body 110 is located in the second position with respect to the main body and a first portion of the movable body 110 and a second portion of the main body 120 are able to support the electronic device, and the electronic device operates in the second operation mode.

In the second posture, the movable body 110 is located in the second position with respect to the main body 120 and the first portion of the movable body 110 and a third portion of the main body 120 can support the electronic device. The electronic device operates in the third operation mode.

The functional unit arranged on the movable body comprises a light emitting unit.

The electronic device further comprises a second display unit on a backside of the first display unit.

The light emitting unit is configured in the third operation mode to provide a display light source for the second display unit.

The second display unit may be an e-ink display unit including an e-ink display screen. The e-ink display unit needs the environment light to provide environmental illumination in display; otherwise, it cannot achieve display operation.

In the embodiment, the functional unit arranged on the movable body 110 further includes a light emitting unit. In an example, the light emitting unit may include a LED light source. The LED light source is a light emitting diode. In addition, the light emitting unit may also be other light emitting source, such as CCFL cold cathode diode light emitting source.

When the electronic device is located in the second posture, the electronic device operates in the third operation mode. In the operation mode, the light emitting unit is in an ON state, which can provide a display light source for the second display unit.

The light emitting unit arranged on the movable unit can further thin the electronic device to flat the electronic device, in comparison with that the light emitting unit arranged on the second display unit due to limitation of the forms of the electronic device in the prior art.

Thirty-First Embodiment of the Electronic Device

As illustrated in FIGS. 1-14, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side equal to a length of a short side of the first surface.

The first surface and the second surface are both located in a first plane when the movable body is located in the first position with respect to the main body.

The operation modes of the electronic device comprise a first operation mode and a second operation mode.

The electronic device operates in the first operation mode when the movable body 110 is located in the first position with respect to the main body while the electronic device operates in the second operation mode when the movable body 110 is located in the second position with respect to the main body.

The electronic device further has a third operation mode.

The electronic device may also operate in the third operation mode when the movable body 110 is located in the second position with respect to the main body 120.

The electronic device in the embodiment not only may operate in the first operation mode and the second operation mode, but also may operate in the third operation mode. When the movable body 110 is located in the second position with respect to the main body 120, the electronic device can operate in the third operation mode.

As shown in FIGS. 3-4, the movable body 110 has a first posture and a second posture when it is located in the second position with respect to the main body 120. In the first posture, the movable body 110 is located in the second position with respect to the main body and a first portion of the movable body 110 and a second portion of the main body 120 are able to support the electronic device, and the electronic device operates in the second operation mode.

In the second posture, the movable body 110 is located in the second position with respect to the main body 120 and the first portion of the movable body 110 and a third portion of the main body 120 can support the electronic device. The electronic device operates in the third operation mode.

The functional unit arranged on the movable body comprises a light emitting unit.

The electronic device further comprises a second display unit on a backside of the first display unit.

The light emitting unit is configured in the third operation mode to provide a display light source for the second display unit.

The main body 120 further includes a third surface. The movable body 110 further includes a fourth surface. The third surface and the fourth surface at least partly face each other. The light emitting unit is located at least partly on the fourth surface. The third surface and the fourth surface are surfaces forming the engagement area in the above embodiments.

The light emitting unit is arranged on the fourth surface. When the movable body 110 is located in the first position with respect to the main body 120, the light emitting unit is hidden. When the movable body 110 is located in the second position with respect to the main body 120, the light emitting unit is exposed. When use of the light emitting unit is needed, the light emitting unit can be hidden. In this way, the electronic device can be protected better. In the embodiment, the light emitting unit is arranged on the fourth surface. In this way, the rays emitted from the light emitting unit reach the second display unit in a desired manner. In comparison with the light emitting unit arranged on the end portion of the movable body 110 or on the surface of the main body 120, the illumination of the light emitting unit can be used sufficiently as possible, which contributes to the display of the second display unit.

Thirty-Second Embodiment of the Electronic Device

As illustrated in FIGS. 1-14, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side equal to a length of a short side of the first surface.

The first surface and the second surface are both located in a first plane when the movable body is located in the first position with respect to the main body.

The operation modes of the electronic device comprise a first operation mode and a second operation mode.

The electronic device operates in the first operation mode when the movable body 110 is located in the first position with respect to the main body while the electronic device operates in the second operation mode when the movable body 110 is located in the second position with respect to the main body.

The electronic device further has a third operation mode.

The electronic device may also operate in the third operation mode when the movable body 110 is located in the second position with respect to the main body 120.

The electronic device in the embodiment not only may operate in the first operation mode and the second operation mode, but also may operate in the third operation mode. When the movable body 110 is located in the second position with respect to the main body 120, the electronic device can operate in the third operation mode.

As shown in FIGS. 3-4, the movable body 110 has a first posture and a second posture when it is located in the second position with respect to the main body 120. In the first posture, the movable body 110 is located in the second position with respect to the main body and a first portion of the movable body 110 and a second portion of the main body 120 are able to support the electronic device, and the electronic device operates in the second operation mode.

In the second posture, the movable body 110 is located in the second position with respect to the main body 120 and the first portion of the movable body 110 and a third portion of the main body 120 can support the electronic device. The electronic device operates in the third operation mode.

The functional unit arranged on the movable body comprises an image capturing unit. The image capturing unit may include an image capturing structure such as a camera or a camcorder.

The movable body 110 comprises a second end surface adjacent to the second surface. The movable body 110 preferably has a shape of strip. In this way, the movable body 110 may form two end portions. The first end surface may be a surface of one of two end portions.

The image capturing unit 160 is located on the second end surface and is configured to collect and form a first image in the third operation mode.

The image capturing unit 160 is located on the second end surface. The first end surface of the movable body supports the main body 120 on the table. The second end surface may be the end surface opposed to the first end surface.

In this way, the image capturing unit can just align with the user to collect an image. As the movable body 110 can support the electronic device on the table such that the electronic device may collect the image without swaying of its body so as to improve the quality of image capturing.

Thirty-Third Embodiment of the Electronic Device

As illustrated in FIGS. 1-15, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side equal to a length of a short side of the first surface.

The first surface and the second surface are both located in a first plane when the movable body is located in the first position with respect to the main body.

The operation modes of the electronic device comprise a first operation mode and a second operation mode.

The electronic device operates in the first operation mode when the movable body 110 is located in the first position with respect to the main body while the electronic device operates in the second operation mode when the movable body 110 is located in the second position with respect to the main body.

The electronic device further has a third operation mode.

The electronic device may also operate in the third operation mode when the movable body 110 is located in the second position with respect to the main body 120.

The electronic device in the embodiment not only may operate in the first operation mode and the second operation mode, but also may operate in the third operation mode. When the movable body 110 is located in the second position with respect to the main body 120, the electronic device can operate in the third operation mode.

The movable body 110 has a first posture and a second posture when it is located in the second position with respect to the main body 120. In the first posture, the movable body 110 is located in the second position with respect to the main body and a first portion of the movable body 110 and a second portion of the main body 120 are able to support the electronic device, and the electronic device operates in the second operation mode.

In the second posture, the movable body 110 is located in the second position with respect to the main body 120 and the first portion of the movable body 110 and a third portion of the main body 120 can support the electronic device. The electronic device operates in the third operation mode.

The functional unit arranged on the movable body comprises an image capturing unit. The image capturing unit may include an image capturing structure such as a camera or a camcorder.

The movable body 110 comprises a second end surface adjacent to the second surface. The movable body 110 preferably has a shape of strip. In this way, the movable body 110 may form two end portions. The first end surface may be a surface of one of two end portions.

The image capturing unit 160 is located on the second end surface. The first end surface of the movable body supports the main body 120 on the table. The second end surface may be the end surface opposed to the first end surface.

The electronic device further comprises a communication unit.

The first display unit 130 comprises a first display region and a second display region. The first display unit 130 is configured to display the first image in the third operation mode.

The communication unit is configured to transmit the first image to another electronic device and to receive a second image form it.

The second display region is configured to display the second image.

The communication unit may include a wireless communication unit, for example a mobile communication unit, including a communication unit for mobile communication by using 2G, 3G, 4G or 5G technology. The wireless communication unit may also include units for Internet wireless communication such as WIFI communication unit.

The first display unit is divided into two display regions. One of the display regions is configured to display the image collected and formed by the image capturing unit of the electronic device, and the other one is configured to display the image received from other electronic device. In this way, the video communication may be achieved while the electronic device is supported by the movable body 110 on the table. Such video communication in the above manner can apparently avoid the weariness of the user caused by hand-holding the electronic device and can improve the user's experiences, in comparison with the communication which needs the user to hold the cell phone or tablet computer by hands in the prior art.

Thirty-Fourth Embodiment of the Electronic Device

As illustrated in FIGS. 1-15, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side equal to a length of a short side of the first surface.

The first surface and the second surface are both located in a first plane when the movable body 110 is located in the first position with respect to the main body 120.

The operation modes of the electronic device comprise a first operation mode and a second operation mode.

The electronic device operates in the first operation mode when the movable body 110 is located in the first position with respect to the main body 120 while the electronic device operates in the second operation mode when the movable body 110 is located in the second position with respect to the main body.

The first detection unit is located in the main body 120 and is configured to determine the posture of the electronic device when the movable body 110 is located in the second position with respect to the main body 120.

In the embodiment, the electronic device includes the first detection unit configured to detect the posture of the electronic device when the movable body 110 is located in the second position with respect to the main body 120.

Apparently, depending on whether the movable body 110 is in the first posture or the second posture with respect to the main body 120, the height of inclination of the electronic device becomes different. The first detection unit may be an electronic device such as gyroscope, may perform the detection in acceleration direction or speed direction up and down or left and right. So, when the electronic device switches from one posture into the other posture, acceleration or speed may be formed correspondingly. By means of detecting the motion parameters of the electronic device during changing the postures of the electronic device, the gyroscope can determine whether the current electronic device is in the first posture or the second posture.

After the first detection unit detects the postures of the electronic device, the control unit of the electronic device can control the electronic device to operate in the corresponding second operation mode or third operation mode, depending on the postures of the electronic device.

The electronic device in the embodiment can achieve intelligent detection of the postures of the electronic device by arrangement of the first detection unit to provide reference for intelligent switching operation modes. It has an advantage of high intelligence.

Thirty-Fifth Embodiment of the Electronic Device

As illustrated in FIGS. 1-15, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit, the movable body comprising a second surface which has a length of a long side identical to a length of a short side of the first surface.

The first surface and the second surface are both located in a first plane when the movable body 110 is located in the first position with respect to the main body 120.

The operation modes of the electronic device comprise a first operation mode and a second operation mode.

The electronic device operates in the first operation mode when the movable body 110 is located in the first position with respect to the main body 120 while the electronic device operates in the second operation mode when the movable body 110 is located in the second position with respect to the main body 120.

The electronic device further comprises a second detection unit configured to detect the position of the movable body with respect to the main body.

The electronic device in the embodiment further comprises a second detection unit. The second detection unit may be a brightness sensing unit for detecting the position of the movable body 110 with respect to the main body 120.

In the embodiment, the second detection unit may include a first position detection module and a second position detection module. The first position detection module is located on the movable body 110 and the second position detection module is located on the main body 120. The first position detection module is configured to detect the third position of the movable body 110. The second position detection module is configured to detect the fourth position of the main body 120. Depending on the third position and the fourth position, the second detection unit can also determine whether the movable body 110 is in the first position or second position with respect to the main body 120.

Apparently, by means of the arrangement of the second detection unit, the electronic device in the embodiment may intelligently detect the position relation between the movable body 110 and the main body 120, so as to prepare for the switching operation modes of the electronic device. Thus, the electronic device according to the embodiment has advantages of high intelligence and high satisfaction of the user.

Thirty-Sixth Embodiment of the Electronic Device

As illustrated in FIG. 5, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length equal to the length of a short side of the first surface, as an example, the long side of the second surface has a length not less than ½ of the short side of the first surface.

The first surface and the second surface are both located in a first plane when the movable body 110 is located in the first position with respect to the main body 120.

The movable body 110 comprises a second end surface adjacent to the second surface, and the functional unit comprises a second functional unit arranged at least partly on the second end surface.

In the embodiment, the movable body 110 may have a shape of strip. Apparently, the movable body 110 having the shape of strip includes two end portions. The surfaces corresponding to the two end portions may be end surfaces. The second end surface in the embodiment is one of the two end surfaces.

The second end surface in the embodiment may be flat face or curve face. The curve surface may be a folded face or an arc-shape face. The term of "folded face" is a curve face formed by two flat faces crossing with each other at a non-right angle.

In the embodiment, the second end surface of the movable body 110 is provided with a second functional unit. In this way, the volume and surface area of the electronic device in the embodiment may be utilized sufficiently. Thus, the electronic device has characteristics of compact and elaborate structure.

In the embodiment, the functional unit is typically a power consumption unit, which needs to consume certain energy in operation, for example, consume certain electrical energy. The second functional unit may be any of various functional units such as a light emitting unit or an image capturing unit.

As an example, the second functional unit is an image capturing unit located on the end surface. When the user needs to collect the image, the movable body 110 may be located in the second position with respect to the main body 120. In this way, the image capturing unit can exactly be aligned with the user. Thus, the user may collect the image conveniently when he shots or records himself.

Thirty-Seventh Embodiment of the Electronic Device

Figure 15:
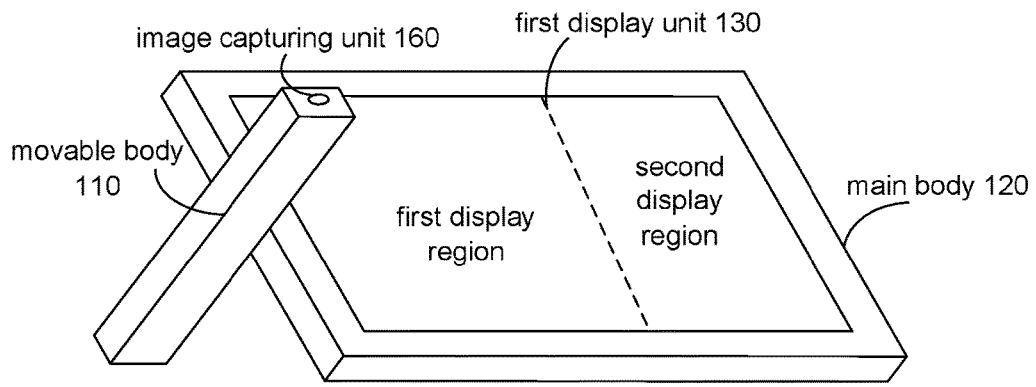
FIG. 15 is a schematic view showing a twelfth structure of an electronic device according to an embodiment of the present disclosure.

As illustrated in FIG. 15, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length identical to the length of a short side of the first surface.

The first surface and the second surface are both located in a first plane when the movable body 110 is located in the first position with respect to the main body 120.

The movable body 110 comprises a second end surface adjacent to the second surface, and the functional unit comprises a second functional unit arranged at least partly on the second end surface.

Thirty-Eighth Embodiment of the Electronic Device

As illustrated in FIG. 15, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length identical to the length of a short side of the first surface.

The first surface and the second surface are both located in a first plane when the movable body 110 is located in the first position with respect to the main body 120.

The movable body 110 comprises a second end surface adjacent to the second surface, and the functional unit comprises a second functional unit arranged at least partly on the second end surface.

Figure 16:
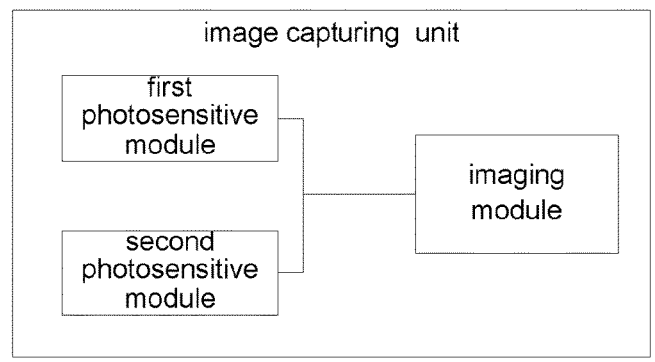
FIG. 16 is a schematic view showing a thirteenth structure of an electronic device according to an embodiment of the present disclosure.

As shown in FIG. 16, the image capturing unit comprises: a first photosensitive module located on the first end surface; a second photosensitive module arranged to be separated from the first photosensitive module; and an image formation module connected to both the first photosensitive module and the second photosensitive module and configured to form a collected image depending on the parameters formed by photo sensing of the first photosensitive module and the second photosensitive module respectively.

Generally, the image capturing unit includes a photosensitive module and an image forming module. The photosensitive module typically includes a lens configured to collect rays. The image forming module forms an image according to the parameters formed by collecting rays by the photosensitive module.

In the embodiment, the image capturing unit at first includes two photosensitive modules arranged separately. In this way, it may be adapted to the image capturing in different application scenes. Two photosensitive modules share one image forming module. Thus, apparently, the structure of the electronic device is simplified, the volume of the electronic device is reduced and the cost for manufacturing the electronic device is reduced.

In an example, the first photosensitive module and the second photosensitive module may be located on the same surface of the movable body 110, or may be located on different surfaces of the movable body 110.

In an example, in order to allow the electronic device to achieve 3D image capturing, the first photosensitive module and the second photosensitive module may be arranged at different positions of the movable body 110. Thus, the subsequent image forming module may form a 3D image by process of image capturing of the two photosensitive modules.

As an example, the second photosensitive module may be located on the second surface. When the second photosensitive module is located on the second surface, the user may shot landscape and the portraits of other persons conveniently while holding the electronic device by hands.

Thirty-Ninth Embodiment of the Electronic Device

Figure 17:
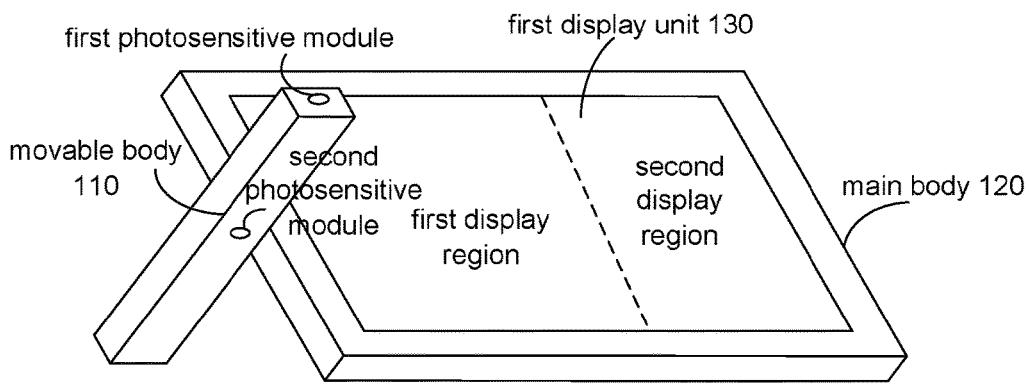
FIG. 17 is a schematic view showing a fourteenth structure of an electronic device according to an embodiment of the present disclosure.

As illustrated in FIG. 17, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length identical to the length of a short side of the first surface.

The first surface and the second surface are both located in a first plane when the movable body 110 is located in the first position with respect to the main body 120.

The movable body 110 comprises a second end surface adjacent to the second surface, and the functional unit comprises a second functional unit arranged at least partly on the second end surface.

As shown in FIGS. 16-17, the image capturing unit comprises: a first photosensitive module located on the first end surface; a second photosensitive module arranged to be separated from the first photosensitive module; and an image formation module connected to both the first photosensitive module and the second photosensitive module and configured to form a collected image depending on the parameters formed by photo sensing of the first photosensitive module and the second photosensitive module respectively.

The electronic device further comprises a driving unit configured to drive the movable body to rotate, the driving unit being configured to drive the movable body to rotate with respect to the main body.

In particular, the driving unit may include members such as a rotation motor. In the embodiment, by means of arrangement of the driving unit, the posture of the electronic device may be altered automatically so as to improve the intelligence of the electronic device again.

In an example, the driving unit may be configured to drive the movable body 110 to form a first predetermined angle in a second plane perpendicular to the first plane with respect to the main body 120 when the first photosensitive module is in operation state.

The first predetermined angle herein is a non-zero angle, for example of 90 degrees. In an example, the driving unit may include a member, such as a step motor, which is able to drive the movable body 110 to move with respect to the main body 120. As the first photosensitive module is located at the first end surface, in convenience of image capturing, the driving unit will drive the rotation of the movable body 110 automatically such that the first photosensitive module and the first display unit are located on the same side of the electronic device so as to collect the image conveniently. Apparently, the electronic device has an advantage of high intelligence.

Fortieth Embodiment of the Electronic Device

Figure 18:
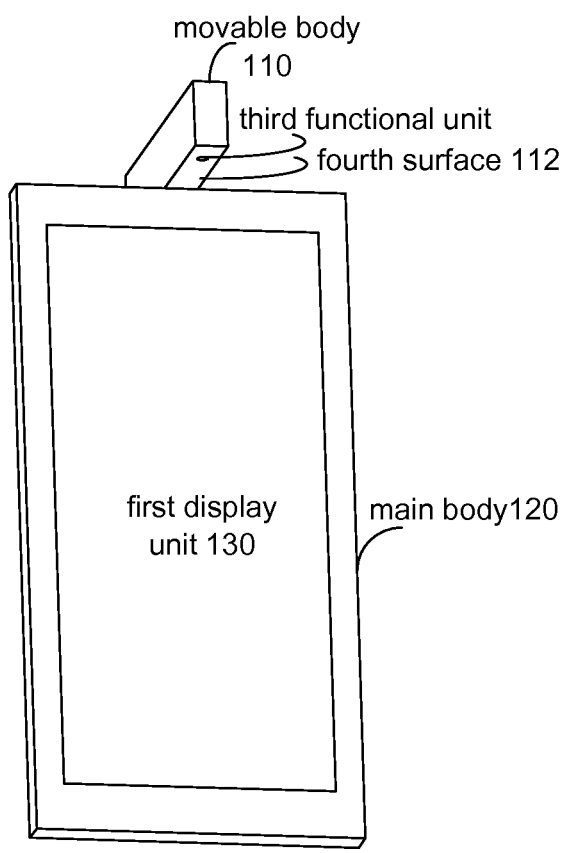
FIG. 18 is a schematic view showing a fifteenth structure of an electronic device according to an embodiment of the present disclosure.

As illustrated in FIG. 18, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length equal to the length of a short side of the first surface, or the second surface may have a long side with a length unequal to the length of a short side of the first surface, as an example, the long side of the second surface has a length equal to ½ of the short side of the first surface.

The first surface and the second surface are both located in a first plane when the movable body 110 is located in the first position with respect to the main body 120.

The main body 120 further comprises a third surface and the movable body further comprises a fourth surface 112, the third surface and the fourth surface 112 at least partly facing each other.

The functional unit comprises a third functional unit arranged at least partly on the fourth surface 112.

In the embodiment, the fourth surface 112 of the movable body 110 is provided with the third functional unit. In this way, the volume and surface area of the electronic device in the embodiment may be utilized sufficiently. Thus, the electronic device has characteristics of compact and elaborate structure.

In the embodiment, the functional unit is typically a power consumption unit, which needs to consume certain energy in operation, for example, consume certain electrical energy. The second functional unit may be any of various functional units such as a light emitting unit or an image capturing unit.

The third functional unit is arranged on the fourth surface. In this way, when the movable body 110 is located in the first position with respect to the main body 120, the third functional unit is in hidden state. When the movable body 110 is located in the second position with respect to the main body 120, the third functional unit is in exposed state. Thus, the movable body 110 not only provides a mounting position for the third functional unit, but also may be used as a protective cover of the third functional unit. Apparently, the electronic device according to the embodiment has characteristics of compact and elaborate structure.

Forty-First Embodiment of the Electronic Device

As illustrated in FIG. 18, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length equal to the length of a short side of the first surface, or the second surface may have a long side with a length unequal to the length of a short side of the first surface, as an example, the long side of the second surface has a length equal to ½ of the short side of the first surface.

The first surface and the second surface are both located in a first plane when the movable body 110 is located in the first position with respect to the main body 120.

The main body 120 further comprises a third surface and the movable body further comprises a fourth surface 112, the third surface and the fourth surface 112 at least partly facing each other.

The functional unit comprises a third functional unit arranged at least partly on the fourth surface 112.

The third functional unit comprises a light emitting unit and the main body 120 further comprises a second display unit. The light emitting unit is configured to provide a display light source for the second display unit when an environmental brightness is lower than the predetermined brightness.

In the embodiment, the second display unit may be arranged at the backside of the first display unit 110. And typically, the second display unit needs the environmental light to provide the display light source in the display operation.

Thus, the third functional unit in the embodiment includes a light-emitting unit. The light-emitting unit may be such as a LED light-emitting unit or a CCFL light-emitting unit. The light-emitting unit may be configured to provide the display light source for the second display unit when the brightness of the environment in which the electronic device is located is lower than the predetermined brightness. In practice, the light-emitting unit may for example emit a light automatically when the brightness of the environment is lower than the predetermined brightness and the second display unit is in operation state. The second display unit is in operation state, that is, the second display unit is in display state which can display information.

In an example, when the brightness of the environment in which the second display unit is located is not less than the predetermined brightness, the display may be performed by using the environmental light. The second display unit in the embodiment unit may be display construction that needs the environmental light to display such as e-ink.

Forty-Second Embodiment of the Electronic Device

As illustrated in FIG. 18, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length equal to the length of a short side of the first surface, or the second surface may have a long side with a length unequal to the length of a short side of the first surface, as an example, the long side of the second surface has a length equal to ½ of the short side of the first surface.

The first surface and the second surface are both located in a first plane when the movable body 110 is located in the first position with respect to the main body 120.

The main body 120 further comprises a third surface and the movable body further comprises a fourth surface 112, the third surface and the fourth surface 112 at least partly facing each other.

The functional unit comprises a third functional unit arranged at least partly on the fourth surface 112.

Figure 19:
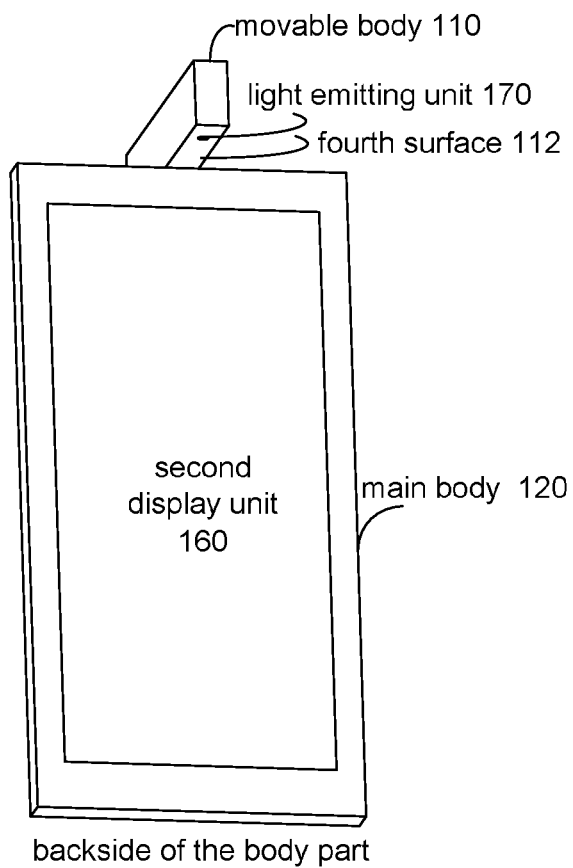
FIG. 19 is a schematic view showing a fifteenth structure of an electronic device according to an embodiment of the present disclosure.

As illustrated in FIG. 19, the third functional unit comprises a light emitting unit 170 and the main body 120 further comprises a second display unit 160. The light emitting unit 170 is configured to provide a display light source for the second display unit 160 when an environmental brightness is lower than the predetermined brightness.

Figure 20:
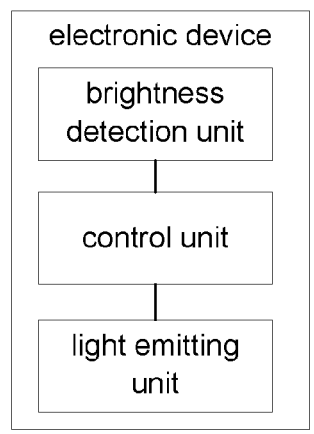
FIG. 20 is a schematic view showing a sixteenth structure of an electronic device according to an embodiment of the present disclosure.

As shown in FIG. 20, the electronic device further comprises: a brightness detection unit configured to detect the environmental brightness in the environment in which the electronic device is located; and a control unit configured to control the light emitting unit to emit a light when the environmental brightness is lower than the predetermined brightness.

In the embodiment, the brightness detection unit is configured to detect the environmental brightness in the environment in which the electronic device is located. The brightness detection unit must be arranged on an outer surface of the electronic device. In an example, it may be arranged on the side face of the main body 120. In an example, if the electronic device includes an image capturing unit, the photo-sensitive model in the image capturing unit may be used as the brightness detection unit in the embodiment to detect the brightness of the environment light.

The control unit may include specific structures such as a control chip or a control processor. The controller may be used to control the light emitting unit to switch on and off. It may control whether the light emitting unit emits a light or not, depending on whether the functional circuit of the light emitting unit is conducted or not.

As an example, the control unit includes a controlled switch arranged in the functional circuit of the light emitting unit. The controlled switch may be such as a transistor or a triode. The control unit may control the power supply circuit of the light emitting unit in which the transistor or the triode is connected to become opened or closed at two ends by controlling the gate source voltage of the transistor or base current and collector current of the triode so as to further control whether the light emitting unit does emit a light or not.

In view of above, the embodiment provides an electronic device. By means of provision of the brightness detection unit and the control unit, the light emitting unit of the electronic device can be controlled to switch on and off automatically. In this way, the intelligence of the electronic device and the user's experiments may be improved.

Forty-Third Embodiment of the Electronic Device

As illustrated in FIG. 18, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length equal to the length of a short side of the first surface, or the second surface may have a long side with a length unequal to the length of a short side of the first surface, as an example, the long side of the second surface has a length equal to ½ of the short side of the first surface.

The first surface and the second surface are both located in a first plane when the movable body 110 is located in the first position with respect to the main body 120. The main body 120 further comprises a third surface and the movable body further comprises a fourth surface 112, the third surface and the fourth surface 112 at least partly facing each other. The functional unit comprises a third functional unit arranged at least partly on the fourth surface 112.

The third functional unit comprises a light emitting unit 170 and the main body 120 further comprises a second display unit 160. The light emitting unit 170 is configured to provide a display light source for the second display unit 160 when an environmental brightness is lower than the predetermined brightness.

As shown in FIG. 19, the first display unit 130 and the second display unit 160 are located in different surfaces of the main body respectively, for example, the second display unit 160 may be located such as at the backside of the first display unit. The first display unit and the second display unit are different types of display units.

In the embodiment, the first display unit may be a colored display unit and the second display unit may be a monochromatic display unit. In an example, the first display unit may be a liquid crystal display unit including a liquid crystal display screen, an OLED display unit including an organic light-emitting diode OLED display screen or a projection display unit including a projection display screen. The second display unit may be an e-ink display unit including an e-ink display screen.

In a further embodiment, typically, the first display unit and the second display unit have different power consumptions. Generally, the power consumption of the monochromatic display unit is lower than that of the colored display unit. In the embodiment, the power consumption of the first display unit is typically greater than that of the second display unit.

In summary, in the embodiment, the first display unit 130 and the second display unit 160 are arranged as different types of display units. In this way, the electronic device can meet the display requirements in various circumstances. In an example, if the current electronic device has a relatively low residual electrical energy and the first display unit and the second display unit have different power consumptions, the electronic device may select the display unit with lower power consumption on the basis of the instructions of the user or according to the internal instructions, so as to reduce the power consumption of the electronic device and prolong the stand-by time of the electronic device.

Forty-Fourth Embodiment of the Electronic Device

As illustrated in FIG. 18, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length equal to the length of a short side of the first surface, or the second surface may have a long side with a length unequal to the length of a short side of the first surface, as an example, the long side of the second surface has a length equal to ½ of the short side of the first surface.

The first surface and the second surface are both located in a first plane when the movable body 110 is located in the first position with respect to the main body 120. The main body 120 further comprises a third surface and the movable body 110 further comprises a fourth surface 112, the third surface and the fourth surface 112 at least partly facing each other. The functional unit comprises a third functional unit arranged at least partly on the fourth surface 112.

The third functional unit comprises a light emitting unit 170 and the main body 120 further comprises a second display unit 160. The light emitting unit 170 is configured to provide a display light source for the second display unit 160 when an environmental brightness is lower than the predetermined brightness.

The operation mode of the electronic device comprises: a fourth operation mode in which the first display unit 130 is in operation state while the second display unit 160 is in non-operation state; and a fifth operation mode in which the first display unit 130 is in non-operation state while the second display unit 160 is in operation state.

In the embodiment, the operation modes of the electronic device include the fourth operation mode and the fifth operation mode, which are arranged corresponding to the display of the display units.

In an example, if desired, the electronic device may hold both the first display unit and the second display unit in display state. However, in the embodiment, in order to reduce the power consumption of the electronic device, typically, in one operation mode, only one display unit is in the operation mode.

In the embodiment, the display unit in the non-operation mode means that it does not refresh information displayed on the display units any longer. Without refreshing the information of the display unit, it apparently saves the driving power consumption for refreshing the information displayed on the display unit. In addition, the display unit in the non-operation mode may also mean that the display state of the display unit is not maintained. In an example, when the first display unit is a liquid crystal display unit, if the first display unit is in the non-operation state, the first display unit will be in shut-off state.

There are many specific states corresponding to the display unit in the non-operation state. In summary, these states may be any state with power consumption lower than that of the display unit in the operation state, for example the rest state of the display unit.

Although the electronic device in the embodiment is provided with two display units, only one display unit of the electronic device is in the operation state for saving power consumptions in the fourth operation mode and the fifth operation mode. Apparently, it may prolong the stand-by time of the electronic device.

It should be noted that in the embodiment, it is not intended to exclude the electronic device further including a sixth operation mode. In the sixth operation mode, the first display unit and the second display unit both in the operation state. In the mode, the first display unit and the second display unit may display same information or different information.

As an example, the electronic device is in the sixth operation mode, the first user may watch video on the first display unit on one side of the electronic device while the second user may read e-books on the second display unit on the other side of the electronic device.

In an example, when the electronic device is in the sixth operation mode, if the first user and the second user are located in a quiet environment such as in a library, the first user and the second user may interchange texts and graphs by the electronic device. At that time, the electronic device may be put between the users. The users may see the same information simultaneously by different display units.

Forty-Fifth Embodiment of the Electronic Device

As illustrated in FIG. 18, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length equal to the length of a short side of the first surface, or the second surface may have a long side with a length unequal to the length of a short side of the first surface, as an example, the long side of the second surface has a length equal to ½ of the short side of the first surface.

The first surface and the second surface are both located in a first plane when the movable body 110 is located in the first position with respect to the main body 120. The main body 120 further comprises a third surface and the movable body 110 further comprises a fourth surface 112, the third surface and the fourth surface 112 at least partly facing each other. The functional unit comprises a third functional unit arranged at least partly on the fourth surface 112.

The third functional unit comprises a light emitting unit 170 and the main body 120 further comprises a second display unit 160. The light emitting unit 170 is configured to provide a display light source for the second display unit 160 when an environmental brightness is lower than the predetermined brightness.

The operation mode of the electronic device comprises: a fourth operation mode in which the first display unit 130 is in operation state while the second display unit 160 is in non-operation state; and a fifth operation mode in which the first display unit 130 is in non-operation state while the second display unit 160 is in operation state.

The electronic device further comprises: an input unit configured to receive a first input of a user, for instructing the first display unit 130 to become into the operation state; and a control unit configured to control the first display unit 130 to become into the operation state and to control the second display unit 160 to become into the non-operation state, in response to the first input.

The input unit may be any human-computer interaction interface, for example, touch screen, voice interaction interface or keyboard.

In the embodiment, due to characteristics of exclusive display of the display unit in the electronic device, that is, only one display unit displays at one time, when the first input of the user instructing the first display unit to become into the operation state is received, the second display unit may also be controlled intelligently to become into the non-operation state. In this way, the power consumption of the electronic device may apparently be saved and the intelligence of the electronic device may be improved.

In a further embodiment, the input unit is configured to receive a second input of the user for instructing the second display unit 160 to become into the operation state; and the control unit is configured to control the second display unit 160 to become into the operation state and to control the first display unit 130 to become into the non-operation state, in response to the second input.

As such, when the second input of the user instructing the second display unit 160 to become into the operation state is received, the first display unit may also be controlled intelligently to become into the non-operation state. Apparently, the electronic device may achieve intelligent switching between the fourth operation mode and the fifth operation mode.

The details for means for control the respective display units to be switched among different operation states may refer to the prior art, and thus will be omitted herein.

In the present application, the control unit may include components such as a processor or a processing chip.

Forty-Sixth Embodiment of the Electronic Device

As illustrated in FIG. 18, the embodiment provides an electronic device. The electronic device includes: a movable body 110 in which at least one functional unit is arranged and a main body 120.

The movable body 110 is movable from a first position to a second position with respect to the main body 120, the main body 120 comprising a first surface provided with a first display unit 130, the movable body comprising a second surface. The second surface may have a long side with a length equal to the length of a short side of the first surface, or the second surface may have a long side with a length unequal to the length of a short side of the first surface, as an example, the long side of the second surface has a length equal to ½ of the short side of the first surface.

The first surface and the second surface are both located in a first plane when the movable body 110 is located in the first position with respect to the main body 120. The main body 120 further comprises a third surface and the movable body 110 further comprises a fourth surface 112, the third surface and the fourth surface 112 at least partly facing each other. The functional unit comprises a third functional unit arranged at least partly on the fourth surface 112.

Figure 21:
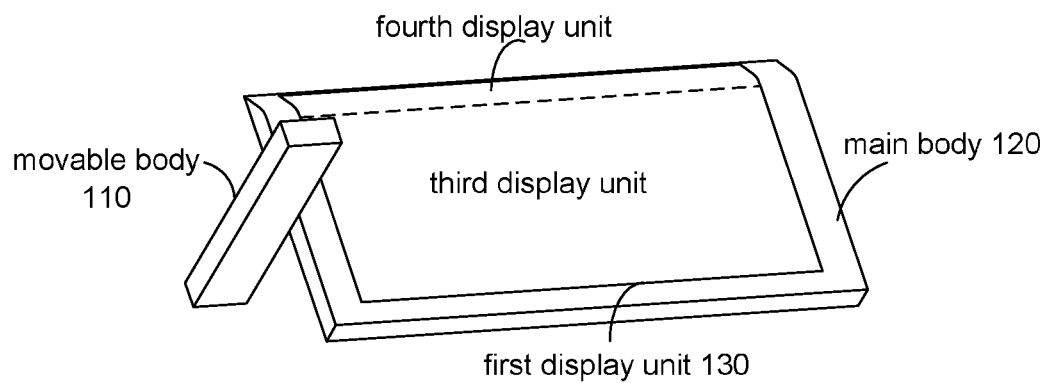
FIG. 21 is a schematic view showing a seventeenth structure of an electronic device according to an embodiment of the present disclosure.

As shown in FIG. 21, the main body 120 further comprises a first side arranged adjacent to the first surface, the first side forming an angle great than 90° and less than 180° to the fifth surface.

The first display unit 130 comprises a third display region located on the first surface and a fourth display region located on the first side.

The first display unit 130 may be a bendable and flexible display unit. In this way, the display region located on the first surface is the third display region. The display region located on the first side is the fourth display region. The first display unit 130 may also be a hard screen. The third display region and the fourth display region are located in the respective plane screens. In an example, the first display unit 130 includes a first liquid crystal screen and a second liquid crystal screen. The display region of the first liquid crystal screen is the third display region. The second liquid crystal screen is the fourth display region.

The first surface is called front face of the electronic device. The first side is the side of the electronic device. The side of the electronic device according to the embodiment is also provided with the display region. Apparently, it increases the display area of the electronic device so as to meet the requirements of the customers for large screen display.

In an example, the third display region and the fourth display region may cooperate with each other to achieve the same function. Or they may operate respectively so as to display different information to meet different requirements of the users.

As an example, in the fourth display region, is configured to display information formed on the basis of triggering of communication events when the third display region displays multimedia information.

When the electronic device is a cell phone, if the third display region is displaying multimedia information such as videos or pictures in full screen, the conventional electronic device will stop displaying the videos and display an interface of incoming telegram once a call is received. However, in some cases, the user does not want to stop the display of videos to connect the call. The electronic device in the embodiment may solve the problem well. When the user watches the videos on the third display region in full screen, if a call is received, the information such as phone number and title of the incoming telegram and icons associated with connecting or refusing, such as an connecting key or a refusing key will be displayed on the fourth display region to allow the user to answer the call.

In another example, in the prior art, if the electronic device displays the videos or texts & graphs, it generally will not display widget for operation of the videos or texts & graphs. And if the user needs operation, the corresponding region should be hit at first and the display unit displays the widget at first on the basis of the videos or texts & graphs and then receives the operation of the user. Apparently, the operation of the user is complicated. As an example, there are widgets such as fast forward, stop, progress bar widgets. Typically, these widgets are displayed below the videos, which may block part of video information, such as subtitle information. Apparently, such display mode not only causes complicated operation of the user, but also may affect the user's experience during watching videos.

The fourth display region is configured to display widget for controlling the display of the third display region when the third display region displays multimedia information.

In the embodiment, the information such as fast forward, stop, progress bar and bullet screen widget is displayed on the fourth display region. When the user needs to operate these widgets, he only needs to directly touch the widget on the fourth display region. It may save one touch of the user without causing adverse effects on watching videos of the user.

As the electronic device according to the embodiment includes the movable body 110 and the main body 120, when the movable body 110 is located in the second position with respect to the main body 120 and the end portion of the movable body 110 supports the electronic device on the table, if the user clicks the first display unit 130 directly, the problem such as movement of the electronic device due to excessive forces of the user may occur.

The first side in the embodiment is typically located above the third display region when the electronic device is in the second posture. In case that the user clicks the first display unit by the same strength, the strength applied by the user will have a greater component in vertically downward direction such that the probability of movement of the electronic device is lower than the probability of directly clicking the first surface.

It will be noted that the first display unit may typically be a display interaction unit, in particular, a display interaction unit including a touch screen.

Forty-Seventh Embodiment of the Electronic Device

Figure 22:
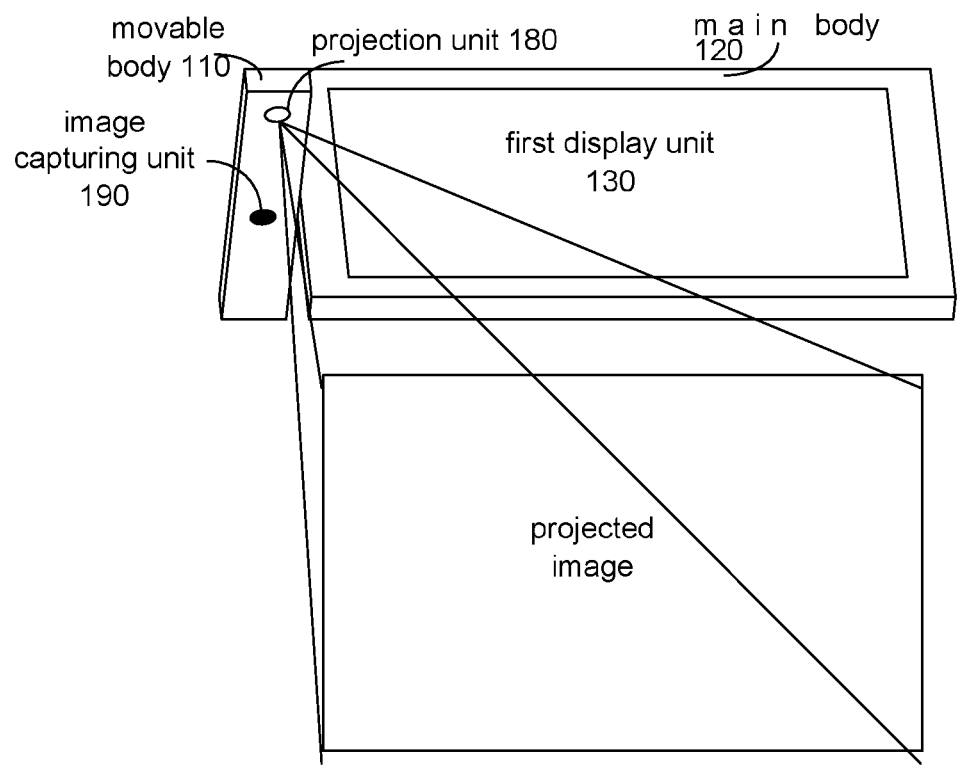
FIG. 22 is a schematic view showing an eighteenth structure of an electronic device according to an embodiment of the present disclosure.

As illustrated in FIG. 22, the embodiment provides an electronic device. The electronic device includes: a movable body 110 and a main body 120.

The movable body 110 is movable from a first position to a second position with respect to the main body 120, the main body 120 comprising a first surface provided with a first display unit 130, the movable body comprising a second surface. The first surface and the second surface are both located in a first plane when the movable body 110 is located in the first position with respect to the main body 120.

The movable body 110 is provided with at least two different types of functional units thereon. That is, the movable body 110 is provided with at least two functional units thereon, the at least two functional units being different types of functional units.

The two different types of functional units are both power consumption units, for example electrical energy consumption unit. In an example, the two functional units 110 arranged on the movable body 110 may include such as an image capturing unit and a light emitting unit. The functional units arranged on the movable body 110 may include components such as an audio output unit and an antenna unit.

In FIG. 22, the movable body 110 is provided with a projection unit 180 and an image capturing unit 190. The projection unit 180 in the first posture shown in FIG. 3 forms the projection image as shown in FIG. 22.

In an example, the functional unit arranged on the movable body 110 comprises an audio function unit and an image function unit. The audio functional unit may be a functional unit for processing the audio information, for example, may be an audio collection unit or an audio output unit. The image functional unit may be the unit that can process the image, for example may be an image capturing unit.

In the embodiment, the movable body 110 is a mounting structure of a multifunctional unit instead of a component arranged specially to achieve a certain function. However, it should be noted that the main body 120 according to the embodiment is the main body of the electronic device. The movable body 110 is an attached portion of the main body 120.

The movable body 110 may have a shape of strip. The end portion of the movable body 110 having the shape of strip can be configured to support the main body 120, so as to allow the electronic device to be supported obliquely on the support table. Typically, the long side of the second surface in the movable body 110 may have a length equal to the length of the short side of the first surface.

Forty-Eighth Embodiment of the Electronic Device

Figure 23:
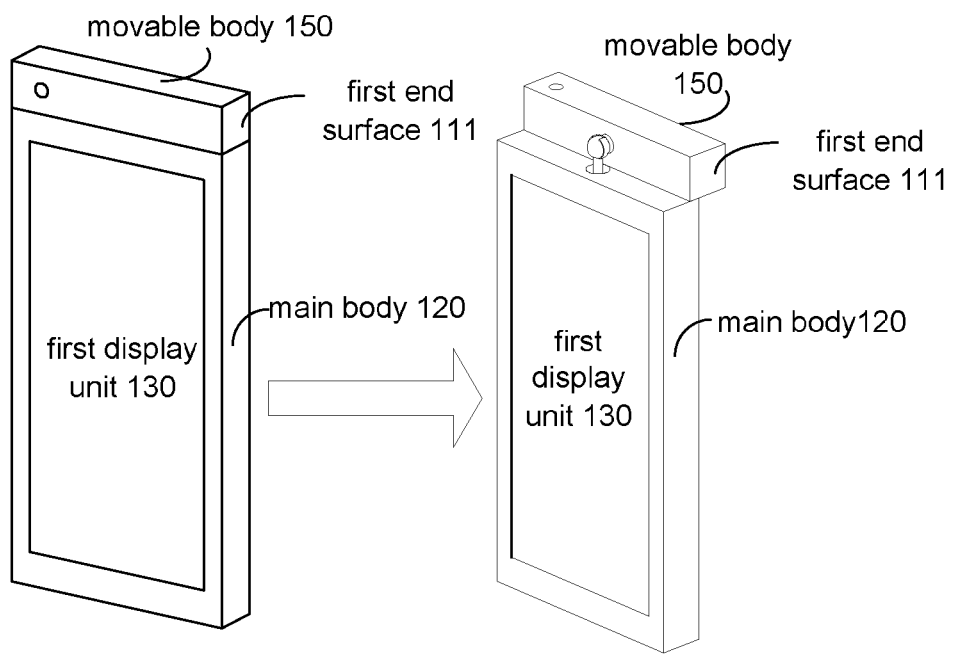
FIG. 23 is a schematic view showing a rotation conversion of an electronic device with a lining according to an embodiment of the present disclosure.

As illustrated in FIG. 23, the embodiment provides an electronic device. The electronic device includes: a movable body 110 in which at least one functional unit is arranged and a main body 120. The definition to the functions may refer to the above embodiments and thus will be omitted herein.

The main body 120 comprises a first surface provided with a first display unit 130, the movable body 120 comprising a second surface and a first end surface 111. The first end surface refers to faces at two ends of the movable body 110. Typically, the movable body 110 may have a shape of strip. The faces at the two ends of the movable body 110 having the shape of strip are the end surfaces. The first end surface is one of the two end surfaces.

The movable body 110 is movable from a first position to a second position with respect to the main body 120. The first surface and the second surface are both located in a first plane when the movable body 110 is located in the first position with respect to the main body. The first end surface 111 is located in the third plane all along when the movable body 110 moves in the third plane with respect to the main body 120, the third plane being perpendicular to the first plane. An intersection line of the third plane and the first plane is parallel to a long side of the first surface.

In FIG. 23, the initial end of an arrow indicates a schematic view showing the movable body 110 being located in the first position with respect to the main body 120 before the movable body 110 has not rotated in the third plane. The forward end of the arrow indicates a schematic view showing the movable body 110 being located in the second position after the movable body 110 has rotated in the third plane with respect to the main body 120. Apparently, the first end surface 111 has moved, but it is located in the third plane all along.

In a further embodiment, as shown in FIG. 23, the second surface has a length of a long side identical to a length of a short side of the first surface.

The movable body 110 is further able to rotate in the second plane. The movable body 110 further comprises a fourth surface adjacent to both the first end surface 111 and the second surface, the second plane being perpendicular to both the first plane and the third plane. The fourth surface is located in the second plane all along when the movable body 110 rotates in the second plane with respect to the main body. An intersection line of the second plane and the first plane is parallel to a short side of the first surface.

In this way, the movable body 110 can rotate both in two planes perpendicular to the first plane with respect to the main body 120. Thus, the posture of the electronic device is further diversified to facilitate the electronic device in different application scenes to meet the requirements of the user better in different postures.

The specific means for both achieving the rotation of the movable body 110 in the third plane and the rotation in the second plane may refer to the corresponding parts of the previous embodiments. In an example, the arrangement of the connecting member connecting the movable body 110 with the main body 120 includes such as an arrangement of the first pivot and the second pivot.

In several embodiments in the present application, it should be understood that the disclosed electronic device and method may be implemented by other means. The above embodiments of electronic device are only exemplified, for example, the division of the units may be a division of logical functions. In an example, other divisions may be applicable. For example, a plurality of units or assemblies may be combined with each other, or may be integrated into another system, or some features may be omitted or may not be performed. In addition, coupling, or direct coupling or communication connection among respective integrate parts displayed or discussed may be indirectly coupling or communication connection by means of some interfaces, devices or units. It may be electrical, mechanical or in other forms.

The above units described as separate components may or may not be separated physically from each other. The components as display units may or may not be physical units. That is, it may be located in one location, or may be distributed on a plurality of network units. It may select part or all of the units as required to achieve the technical solutions of the embodiments.

Further, the respective functional units in the respective embodiments of the present disclosure may be integrated all together in one process unit, or the respective units may be regarded as separate units respectively. Or two or more units may be integrated in single unit. The above integrated unit not only may be implemented in form of hardware, but also may be implemented in form of hardware plus software functional units.

The skilled person in the art would appreciate that all or part of steps in the above process embodiments may be implemented by hardware associated with program instructions. The program may be stored in a computer readable storage medium. When the program is executed, the steps in the above process embodiments are performed. The storage medium includes: all of kinds of media that may storage program codes, such as mobile storage device, read-only memory (ROM), random access memory (RAM), magnetic discs or optical discs.

Or, if the above integrated units in the embodiments are implemented in form of software functional module and sold or used as a separate product, the units may be stored in a computer readable storage medium, which includes some instructions to make a computing device (may be such as a personal computer, a server or a network device) execute all of part of the respective process embodiments of the present disclosure. The storage medium includes: all of kinds of media that may storage program codes, such as mobile storage device, read-only memory (ROM), random access memory (RAM), magnetic discs or optical discs.

The above embodiments are only those of the present disclosure by way of examples instead of limiting the present disclosure. Any modifications or replacements that can be envisaged easily by the skilled person in the art from the present disclosure, should fall within the protect scope of the present disclosure. Therefore, the protect scope of the present disclosure should be defined by the appended claims and equivalents thereof.

What is claimed is:
1. An electronic device, comprising:
a main body; and
a movable body having at least one functional unit, wherein:
the movable body is configured to move from a first position to a second position with respect to the main body;
the main body comprises a first surface provided with a first display unit, the movable body comprises a second surface, a long side of the second surface has a length identical to a length of a short side of the first surface, and the first surface and the second surface are both located in a first plane when the movable body is located in the first position with respect to the main body, the electronic device comprises a first operation mode and a second operation mode, and wherein the electronic device is configured to be in the first operation mode when the movable body is located in the first position with respect to the main body, the electronic device is configured to be in the second operation mode when the movable body is located in the second position with respect to the main body and wherein the electronic device has a third operation mode, and the electronic device is configured to be in the third operation mode when the movable body located in the second position with respect to the main body, and wherein the movable body has a first posture and a second posture corresponding to being located in the second position with respect to the main body, and when in the first posture, a first portion of the movable body and a second portion of the main body are configured to support the electronic device, and the electronic device is in the second operation mode;

when in the second posture, the first portion of the movable body and a third portion of the main body are configured to support the electronic device, and the electronic device is in the third operation mode.

2. The electronic device as claimed in claim 1, wherein the electronic device is configured to respond to more responsive events in the first operation mode than in the second operation mode.

3. The electronic device as claimed in claim 1, wherein:
in the second operation mode, the electronic device is configured to respond to a first type of responsive events while shielding a second type of responsive events, and
in the first operation mode, the electronic device is configured to respond to the second type of responsive events.

4. The electronic device as claimed in claim 1, wherein the functional unit arranged on the movable body comprises a light emitting unit, and the electronic device further comprises a second display unit on a backside of the first display unit, and
wherein the light emitting unit is configured to provide a display light source for the second display unit when the electronic device is in the third operation mode.

5. The electronic device as claimed in claim 4, wherein the main body further comprises a third surface and the movable body further comprises a fourth surface, the third surface and the fourth surface at least partly facing each other, and
wherein the light emitting unit is located at least partly on the fourth surface.

6. The electronic device as claimed in claim 1, wherein the functional unit arranged on the movable body comprises an image capturing unit, the movable body comprises a second end surface adjacent to the second surface, and
wherein the image capturing unit is located on the second end surface and is configured to capture a first image when the electronic device is in the third operation mode.

7. The electronic device as claimed in claim 6, further comprising a transmitter configured to transmit the first image to a second electronic device and receive a second image from the second electronic device,
wherein the first display unit comprises a first display region configured to display the first image when the electronic device is in the third operation mode and a second display region configured to display the second image.

8. The electronic device as claimed in claim 1, wherein the main body further comprises a first detection sensor configured to determine a posture of the electronic device when the movable body is located in the second position with respect to the main body.

9. The electronic device as claimed in claim 1, further comprising a second detection sensor configured to detect a position of the movable body with respect to the main body.

10. The electronic device as claimed in claim 1, wherein a power consumption of the electronic device in the first operation mode is less than a power consumption in the second operation mode.

11. An electronic device, comprising:
a main body; and
a movable body having at least one functional unit, wherein:
the movable body is configured to move from a first position to a second position with respect to the main body;
the main body comprises a first surface provided with a first display unit, the movable body comprises a second surface, a long side of the second surface has a length identical to a length of a short side of the first surface, and
the first surface and the second surface are both located in a first plane when the movable body is located in the first position with respect to the main body,
the electronic device comprises a first operation mode and a second operation mode, and
wherein the electronic device is configured to be in the first operation mode when the movable body is located in the first position with respect to the main body, the electronic device is configured to be in the second operation mode when the movable body is located in the second position with respect to the main body,
wherein in the second operation mode, the electronic device is configured to respond to a first type of responsive events while shielding a second type of responsive events, and in the first operation mode, the electronic device is configured to respond to the second type of responsive events, and
wherein the second type of responsive events comprises a responsive event for detecting movement states of the electronic device.

12. An electronic device; comprising:
a main body; and
a movable body having at least one functional unit, wherein:
the movable body is configured to move from a first position to a second position with respect to the main body;
the main body comprises a first surface provided with a first display unit, the movable body comprises a second surface, a long side of the second surface has a length identical to a length of a short side of the first surface, and
the first surface and the second surface are both located in a first plane when the movable body is located in the first position with respect to the main body, the electronic device comprises a first operation mode and a second operation mode, and wherein the electronic device is configured to be in the first operation mode when the movable body is located in the first position with respect to the main body, the electronic device is configured to be in the second operation mode when the movable body is located in the second position with respect to the main body, wherein the electronic device has a third operation mode, and the electronic device is configured to be in the third operation mode when the movable body is located in the second position with respect to the main body, and wherein the movable body has a first posture and a second posture corresponding to being located in the second position with respect to the main body, and when in the first posture, a first portion of the movable body and a second portion of the main body are configured to support the electronic device, and the electronic device is in the second operation mode;

when in the second posture, the first portion of the movable body and a third portion of the main body are configured to support the electronic device, and the electronic device is in the third operation mode and wherein in the second operation mode, the first display unit is in landscape display mode in which a display region of the first display unit has a display width in a first direction than a display width in a second direction, the first direction being parallel to the horizontal direction, the second direction being perpendicular to the first direction.

13. An electronic device, comprising:
a main body; and
a movable body having at least one functional unit,
wherein:
the movable body is configured to move from a first position to a second position with respect to the main body,
the main body comprises a first surface provided with a first display unit, the movable body comprises a second surface,
the first surface and the second surface are both located in a first plane when the movable body is located in the first position with respect to the main body, and
wherein the movable body comprises a second end surface adjacent to the second surface, and the functional unit comprises a second functional unit arranged at least partly on the second end surface,
wherein the second functional unit is an image capturing unit, and
wherein the image capturing unit comprises:
a first photosensitive module located on the first end surface,
a second photosensitive module separated from the first photosensitive module; and
an imaging module connected to both the first photosensitive module and the second photosensitive module and configured to form an image based on parameters acquired by the first photosensitive module and the second photosensitive module.

14. The electronic device as claimed in claim 13, wherein the second photosensitive module is located on the second surface of the movable body.

15. The electronic device as claimed in claim 13, further comprising a driving unit configured to drive the movable body to rotate with respect to the main body.

16. The electronic device as claimed in claim 15, wherein the driving motor is further configured to drive the movable body to form a first predetermined angle with respect to the main body in a second plane perpendicular to the first plane, when the first photosensitive module is in operation state.

17. An electronic device, comprising:
a main body; and
a movable body having at least one functional unit,
wherein the movable body is configured to move from a first position to a second position with respect to the main body, the main body comprises a first surface provided with a first display unit, the movable body comprises a second surface, and
wherein the first surface and the second surface are both located in a first plane when the movable body is located in the first position with respect to the main body, and
wherein the main body further comprises a third surface and the movable body further comprises a fourth surface, the third surface and the fourth surface at least partly facing each other,
wherein the functional unit comprises a third functional unit arranged at least partly on the fourth surface, and
wherein the third functional unit comprises a light emitting unit, and the main body further comprises a second display unit, the light emitting unit is configured to provide a display light source for the second display unit when a brightness of ambient light is lower than a predetermined threshold.

18. The electronic device as claimed in claim 17, further comprising:
a brightness detection sensor configured to detect the brightness of ambient light; and
a control processor configured to control the light emitting unit to emit light when the detected brightness is lower than the predetermined threshold.

19. The electronic device as claimed in claim 17, wherein the first display unit and the second display unit are located on different surfaces of the main body, the first display unit and the second display unit are different types of display units.

20. The electronic device as claimed in claim 19, wherein a power consumption of the second display unit is lower than that of the first display unit.

21. The electronic device as claimed in claim 19, wherein the electronic device comprises a fourth operation mode in which the first display unit is in operation state while the second display unit is in non-operation state; and
a fifth operation mode in which the first display unit is in non-operation state while the second display unit is in operation state.

22. The electronic device as claimed in claim 21, further comprising:
an input interface configured to receive a first input of a user; and
a control processor configured to control the first display unit to be in operation state and control the second display unit to be in non-operation state, in response to the first input.

23. The electronic device as claimed in claim 22, wherein the input interface is further configured to receive a second input of the user; and
the control processor is configured to control the second display unit to be in operation state and control the first display unit to be in non-operation state, in response to the second input.

24. An electronic device, comprising:
a main body; and
a movable body having at least one functional unit, wherein the movable body is configured to move from a first position to a second position with respect to the main body, the main body comprises a first surface provided with a first display unit the movable body comprises a second surface, and wherein the first surface and the second surface are both located in a first plane when the movable body is located in the first position with respect to the main body, wherein the main body further comprises a third surface and the movable body further comprises a fourth surface, the third surface and the fourth surface at least partly facing each other, wherein the functional unit comprises a third functional unit arranged at least partly on the fourth surface, wherein the main body further comprises a first side adjacent to the first surface, the first side forming an angle greater than 90° and less than 180° with respect to the first surface, and wherein the first display unit comprises a third display region located on the first surface and a fourth display region located on the first side.

25. The electronic device as claimed in claim 24, wherein the fourth display region is configured to display information triggered by communication events, when the third display region is configured to display multimedia information.

26. The electronic device as claimed in claim 25, wherein the fourth display region is configured to display widget for controlling the display of the third display region.

\* \* \* \* \*